United States Patent
Wai et al.

(10) Patent No.: US 6,187,911 B1
(45) Date of Patent: Feb. 13, 2001

(54) METHOD FOR SEPARATING METAL CHELATES FROM OTHER MATERIALS BASED ON SOLUBILITIES IN SUPERCRITICAL FLUIDS

(75) Inventors: Chien M. Wai, Moscow, ID (US); Neil G. Smart, Workington (GB); Cindy Phelps, Moscow, ID (US)

(73) Assignee: Idaho Research Foundation, Inc., Moscow, ID (US)

( * ) Notice: Under 35 U.S.C. 154(b), the term of this patent shall be extended for 0 days.

(21) Appl. No.: 09/306,948

(22) Filed: May 7, 1999

Related U.S. Application Data

(60) Provisional application No. 60/084,832, filed on May 8, 1998.

(51) Int. Cl.$^7$ .................................................. C07F 5/00
(52) U.S. Cl. .......................... 534/11; 210/634; 210/638; 423/3
(58) Field of Search ................... 534/7, 10–16; 423/321.1, 8, 21.5; 210/634, 638, 639, 912, 611; 405/128, 258; 134/2, 25.1

(56) References Cited

U.S. PATENT DOCUMENTS

| | | |
|---|---|---|
| 3,882,018 | 5/1975 | Depree . |
| 3,975,416 | 8/1976 | Mazdiyasni et al. . |
| 4,015,980 | 4/1977 | MacKay et al. . |
| 4,051,223 | 9/1977 | MacKay . |
| 4,069,273 | 1/1978 | Komoto . |
| 4,128,493 | 12/1978 | MacKay et al. . |
| 4,206,132 | 6/1980 | Sievers . |
| 4,275,039 | 6/1981 | Özensoy et al. . |
| 4,457,812 | 7/1984 | Rado . |
| 4,464,251 | 8/1984 | Kukes et al. . |
| 4,465,587 | 8/1984 | Garg et al. . |
| 4,518,484 | 5/1985 | Mann et al. . |
| 4,528,100 | 7/1985 | Zarchy . |
| 4,547,292 | 10/1985 | Zarchy . |
| 4,563,213 | 1/1986 | Hubred . |
| 4,609,043 | 9/1986 | Cullick . |
| 4,867,951 | 9/1989 | Smith et al. . |
| 4,877,530 | 10/1989 | Moses . |
| 4,895,905 | 1/1990 | Schneider et al. . |
| 4,898,673 | 2/1990 | Rice et al. . |
| 4,908,135 | 3/1990 | Brisdon et al. . |
| 4,909,868 | 3/1990 | Melvin . |
| 4,911,941 | 3/1990 | Katz et al. . |
| 4,916,108 | 4/1990 | McLaughlin et al. . |
| 4,923,630 | 5/1990 | Smith et al. . |
| 4,935,498 | 6/1990 | Sessler et al. . |
| 4,942,149 | 7/1990 | Shinbo et al. . |
| 4,964,995 | 10/1990 | Chum et al. . |
| 5,006,254 | 4/1991 | Cailly et al. . |
| 5,045,220 | 9/1991 | Harris et al. . |
| 5,087,370 | 2/1992 | Schultheis et al. . |
| 5,169,968 | 12/1992 | Rice . |
| 5,194,582 | 3/1993 | Eldridge et al. . |
| 5,332,531 | 7/1994 | Horwitz et al. . |
| 5,356,538 | 10/1994 | Wai et al. . |
| 5,606,724 | 2/1997 | Wai et al. . |
| 5,641,887 | 6/1997 | Beckman et al. . |
| 5,730,874 | * 3/1998 | Wai et al. .............................. 210/638 |
| 5,770,085 | * 6/1998 | Wai et al. .............................. 210/638 |
| 5,792,357 | * 8/1998 | Wai et al. .............................. 210/638 |
| 5,840,193 | * 11/1998 | Smart et al. ........................... 210/638 |
| 5,868,856 | * 2/1999 | Douglas et al. .......................... 134/2 |
| 5,965,025 | * 10/1999 | Wai et al. .............................. 210/634 |

FOREIGN PATENT DOCUMENTS

| | | |
|---|---|---|
| WO 92/10263 | 6/1992 | (WO) . |
| WO 95/33541 | 12/1995 | (WO) . |
| WO 95/33542 | 12/1995 | (WO) . |

OTHER PUBLICATIONS

Carrott et al., *High solubility of $UO_2 (NO_3)_2$ 2TBP complex in supercritical $CO_2$*, Chem. Commun. pp. 373–374 (1998).

Consani et al., *Observations on the Solubility of Superfactants and Related Molecules in Carbon Dioxide at 50° C*, The Journal of Supercritical Fluids, 3:51–65 (1990).

Elliott et al., *TRI–n–Octylphosphine Sulfide as Extractant*, Anal. Chim. Acta, 33:237–244 (1965).

Laintz et al., *Extraction of Metal Ions from Liquid and Solid Materials by Supercrfitical Carbon Dioxide*, analytical Chemistry, 54:2675–2678 (1992).

Lin et al., *Supercritical Fluid Extraction of Lanthanides and Actinides from Solid Materials with a Fluorinated β–Diketone*, Analytical Chemistry 65:2549–2551 (1993).

Lin et al., *Supercritical Fluid Extraction of Thorium and Uranium Ions from Solid and Liquid Materials with Fluorinated β–Diketones and Tributyl Phosphate*, Environ. Sci. Technol. 26:1190–1193 (1994).

Lin et al., *Supercritical Fluid Extraction of Lanthanides with Fluorinated β–Diketones and Tributyl Phosphate*, Analytical Chemistry 66:1971–1975 (1994).

(List continued on next page.)

*Primary Examiner*—Dameron Jones
(74) *Attorney, Agent, or Firm*—Klarquist Sparkman Campbell Leigh & Whinston, LLP

(57) ABSTRACT

A method for separating a desired metal or metalloi from impurities using a supercritical extraction process based on solubility differences between the components, as well as the ability to vary the solvent power of the supercritical fluid, is described. The use of adduct-forming agents, such as phosphorous-containing ligands, to separate metal or metalloid chelates in such processes is further disclosed. In preferred embodiments, the extraction solvent is supercritical carbon dioxide and the chelating agent is selected from the group consisting of β-diketones; phosphine oxides, such as trialkylphosphine oxides, triarylphosphine oxides and alkylarylphosphine oxides; phosphinic acids; carboxylic acids; phosphates, such as trialkylphosphates, triarylphosphates and alkylarylphosphates; crown ethers; dithiocarbamates; phosphine sulfides; phosphorothioic acids; thiophosphinic acids; halogenated analogs of these chelating agents; and mixtures of these chelating agents. In especially preferred embodiments, at least one of the chelating agents is fluorinated.

28 Claims, 8 Drawing Sheets

OTHER PUBLICATIONS

Lin et al., *Supercritical Fluid extraction and chromatography of metal chelates and organomettalic compounds,* Trends in Analytical Chemistry 14:123–133 (1995).

Liu et al., *Determination of Organotin Compounds in Environmental Samples by Supercritical Fluid Extraction and Gas Chromatography with Atomic Emission Detection,* Journal of High Resolution Chromatography 16:106–112 (1993).

Liu et al, *Determination of Metals in Solid Samples by Complexation–Supercritical Fluid Extraction and Gas Chromatography–Atomic Emission Detection,* Journal of Chromatographic Science 31:310–316 (1993).

Lo et al., *Solvent Extraction of Dithiocarbamate compleses and Back–Extraction with Mercury (II) for Determination of Trace Metals in Seawater by Atomic Absorption Spectrometry,* Anal. Chem. 54:2536–2539 (1982).

Neeb, *Metal–Chelate Gas–Chromatography for Trace Element Analysis,* Pure & Appl. Chem. 54:847–852 (1982).

Oudsema et al., *Determination of an Organotin Stabilizer in a Rikgid Poly(Vinyl Chloride) Plastic by On–Line Supercritical Fluid Extraction and Chromatography with Formic Acid Modified Carbon Dioxide and Flame Ionization Detection,* Journal of High Resolution Chromatography 16:198–202 (1993).

Smart et al., *Extraction of Toxic Heavy Metals Using Supercritical Fluid Carbon Dioxide Containing Organophosphorus Reagents,* Ind. Eng. Chem. Res. 36:1819–1826 (1997).

Sole et al., *Solvent extraction of copper by Cyanex 272, Cyanex 302, and Cyanex 301,* Hydrometallurgy 37:129–147 (1995).

Tait, *The Extraction of Some Base Metal Ions by Cyanex 301, Cyanex 302 and their Binary Extractant Mixtures with Aliquat 336,* Solvent and Ion Exchange 10(5):799–809 (1992).

Tait, *Cobalt–nickel separation: the extraction of cobalt(II) and nickel(II) by Cyanex 301, Cyanex 302 and Cyanex 272,* Hydrometallurgy 32:365–372 (1993).

Tang et al., *Solvent Extraction of Lanthanides with a Crown Ether Carboxylic Acid,* analytical Chemistry pp. 3233–3255 (1986).

Tang et al., *Enhanced extraction of Lanthanides with Crown Ether Carboxylic Acids of Increasing Lipophilicity,* Analyst 114:451–453 (1989).

Wai et al., *Supercritical Fluid Extraction of Organic and Inorganic Mercury from Solid Materials,* Talanta 40:1325–1330 (1993).

Zhu, *The Separation of Americium from Light Lanthanides by Cyanex 301 Extraction,* Radio. Acta. pp. 95–98 (1995).

Zhu et al., *The Extraction of Americium anf Light Lanthanides by HDEHDTP and Cyanex 302,* (1995).

\* cited by examiner

Solubility of $UO_2(NO_3)_2 \cdot 2TBP$ in supercritical $CO_2$ at 40°C(♦), 50°C (■) and 60°C (▲)

METHOD FOR SEPARATING METAL CHELATES FROM OTHER MATERIALS BASED ON SOLUBILITIES IN SUPERCRITICAL FLUIDS

CROSS REFERENCE TO RELATED APPLICATION

This application claims priority from aplicants' prior provisional application No. 60/084,832, filed May 8, 1998.

ACKNOWLEDGEMENT OF GOVERNMENT SUPPORT

This invention was funded in part by the United States Department of Energy under Grant No. DE-FG02-91ER75679. The United States Government may have certain rights in this invention as a result of this grant.

FIELD

This invention concerns supercritical fluid extractions of metal chelates, and the separation of metal chelates from other materials based on the relative solubilities of the metal chelates and other materials in the supercritical fluid.

BACKGROUND

In order to make use of metals, they first must be extracted from raw materials, such as metal oxides, and thereafter separated from other materials either used for or generated by the extraction process. One particular problem is how to extract metals from materials while minimizing environmental contamination. For example, metals currently are liberated from metal oxides by first crushing the oxide and then treating the crushed material with an acid that dissolves the metals. Acid dissolution is followed by selective precipitation, electrowinning, or solvent extraction. Acid dissolution is unfortunately very nonspecific, and often produces many by-products, including aqueous and organic wastes, that create serious environmental problems in their own right and which must be separated from the metals.

The purification or separation of certain metals from other metals or impurities is critical in many instances. For example, for the commercial processing of uranium, iron is one common impurity that must be separated from the uranium. Further, uranium and plutonium are separated from fission products of spent nuclear fuel using a solvent extraction reagent. The uranium is subsequently separated from the plutonium.

Alternatively, metals may need to be separated from waste streams containing other metals, metalloids or impurities. For example, heavy metals may need to be separated from a waste stream for environmentally benign disposal of other waste in the stream.

It is known to extract metals from materials using supercritical fluid extraction. A supercritical fluid is typically one that is gaseous at ambient conditions, but which is maintained at a temperature and pressure above its critical temperature and pressure. Supercritical solvents can be used to extract organic materials, such as caffeine from coffee beans. U.S. Pat. No. 4,911,941 provides an example of supercritical carbon dioxide extraction of caffeine in which green coffee beans are moved periodically through an extraction vessel and contacted with continuously flowing supercritical carbon dioxide. U.S. Pat. No. 4,898,673 shows a similar system in which soluble materials are continuously extracted from solids using supercritical carbon dioxide. The soluble solids are circulated in a closed-loop pipeline with the supercritical fluid.

Various features of supercritical fluid extraction of metal and metalloids are disclosed in Wai et al.'s U.S. Pat., Nos. 5,356,538, 5,606,724, and 5,730,874; Wai et al.'s U.S. patent application, Ser. No. 08/686,422, entitled Fluid Extraction, filed Jul. 26, 1996; and United States Provisional Patent Application, Serial No. 60/056,749, entitled Method for Dissociating Metal-Ligand Complexes, filed Jul. Aug. 20, 1997. Wai's patents and applications, collectively referred to herein as Wai's patent documents, are incorporated herein by reference. Wai's patent documents disclose various features of extraction of metalloid and metal ions from materials by exposing the material to a fluid solvent, particularly supercritical carbon dioxide, containing a chelating agent.

Despite these prior known processes, there are still some disadvantages of traditional purification processes for metals, such as uranium. These disadvantages include: (a) low purified quantities of metal; (b) time consuming purification steps; and (c) the creation of undesirable waste streams.

A need therefore exists for an environmentally safe method for separating and/or purifying metals from other metals, metalloids and/or impurities. The need further exists for a method which is both efficient and which provides greater yields of the extracted and purified metals.

SUMMARY

The present invention provides a process for separating and purifying a metal from other metals, metalloids, impurities, and unreacted reagents. The method of the present invention is environmentally safer than known methods in that it reduces undesirable waste streams. The method can be carried out efficiently in a relatively short time period, while providing greater yields of the extracted and purified metal without the necessity of using traditional solvents.

More specifically, the present invention provides for the separation of metal chelate complexes from other materials based on the solubility differences of the complexes and other materials in supercritical fluids (preferably supercritical carbon dioxide). In one illustrative embodiment, uranyl chelate complex, which is less soluble in supercritical carbon dioxide, is separated from an iron chelate complex, which is more soluble in supercritical carbon dioxide.

In further accordance with the present invention, unreacted reagents, such as chelating agents or ligands, can be separated from desired metal chelates based on the solubility differential of the unreacted reagents from the metal chelate complexes. In one embodiment, unreacted chelating agent, thenoyltrifluoroacetone (or "TTA"), is separated from uranyl/TTA complex since it is more soluble in the supercritical carbon dioxide solvent used in the extraction process. In one manner of doing so, the reaction cell can be flushed with supercritical fluid (e.g., $CO_2$) subsequent to the reaction phase in order to dissolve and separate any unreacted chelating agent (e.g., TTA) from the metal chelate complex formed (e.g. uranyl/TTA complex). It should be appreciated that the metal can then be separated from the extracted and purified metal chelate complex.

In accordance with a further aspect of the present invention, by varying the physical conditions of the supercritical fluid the ability to seperate the components or metal chelate complexes formed during the supercritical fluid extraction process is enhanced. In this manner, the solvating power of the supercritical fluid can be varied to increase or decrease the solubility of certain impurities or metal chelates with respect to other such components, thereby leading to their separation. In particular, the physical conditions of the supercritical fluid can be varied to achieve a solvation region that is favorable to one particular component over at least one other component. For instance, in one embodiment of the present invention, increasing the pressure will increase the separation of a desired metal chelate from impurities or other undesirable metal chelates. More specifically, in one illustrative embodiment, increasing the pressure of supercritical carbon dioxide solvent increases the solubility of iron chelate complex in the solvent, thereby resulting in its desired separation from less soluble uranyl chelate complex.

In a further aspect of the present invention, the increased solubility of one component can be used to inhibit the uptake or solubility of other components in the supercritical fluid. More specifically, in one embodiment, the increased solubility of iron chelate complex in supercritical carbon dioxide inhibits the uptake of other compounds or metal chelate complexes (such as uranium chelate complex) in the supercritical carbon dioxide. Hence, in this way, iron can be further selectively purified from metals, such as uranium, thorium, or plutonium, in supercritical fluid extraction processes ("SFE").

In yet a further aspect of the present invention, the solubility of a metal chelate complex in supercritical fluid is increased by forming an "adduct" of the complex, thereby allowing better control of the transport and separation of the desired metal complex in the supercritical fluid during the extraction process. In one illustrative embodiment, uranium is directly extracted from metal oxide by exposing it to TTA dissolved in supercritical carbon dioxide. Tributyl phosphate (or "TBP"), an adduct forming agent, is added to the system to form adducts of the uranium chelate complex in order to increase its transport in supercritical carbon dioxide.

The present invention can be used in connection with the separation of metals extracted directly from metal oxides by supercritical fluid extraction. In one embodiment, uranium is separated by the method of the present invention after being extracted from $UO_3$. The metal oxide $UO_2(NO_3)_2$ also can be used. The present invention, however, is also suitable for use with the extraction of thorium from thorium oxide, plutonium from plutonium oxide, or the extraction of other metals from metal oxides as discussed herein. Preferably, a protic chelating agent and supercritical carbon dioxide are used for the direct extraction of metals from metal oxides. The separation and purification techniques can also be used with other supercritical fluid extraction processes.

The chelating agents useful for practicing the present invention can be any agent that: (1) forms a chelate with the metal being extracted; (2) forms chelates which are soluble in the fluid or supercritical fluid solvent; and/or (3) forms chelate which are insoluble in the fluid or supercritical fluid solvent to allow other materoials soluble in the fluid or supercritical fluid to be seperated from the desired metal or material. Without limiting the present invention, examples of suitable chelating agents include: β-diketones; phosphine oxides, such as trialkylphosphine oxides, triarylphosphine oxides and alkylarylphosphine oxides; phosphinic acids; carboxylic acids; phosphates, such as trialkylphosphates, triarylphosphates and alkylarylphosphates; crown ethers; dithiocarbamates; phosphine sulfides; phosphorothioic acids; thiophosphinic acids; halogenated analogs of these chelating agents; and mixtures of these chelating agents.

In yet other embodiments of the invention, a modifier is added to the supercritical fluid to further enhance the efficiency of the extraction method by increasing the solubility of metal chelates in the supercritical fluid. Supercritical carbon dioxide, for example, is a relatively non-polar solvent. Its polarity can be increased by adding a more polar solvent to the carbon dioxide. Disclosed examples of more polar solvents include water and low to medium boiling point alcohols or esters, such as lower-alkyl alcohols and esters, methanol being one example. The alcohol or ester increases the polarity of the supercritical fluid, enhances the solubility of the metal chelate in the fluid, and further improves the extraction efficiency of the method.

Fluid or supercritical fluid can be flowed continuously through material containing the metal, or exposed to the material in a discontinuous batch process. In one embodiment, a supercritical fluid is flowed through a chelating agent to dissolve the chelating agent in the fluid before exposing the waste material to the fluid. After the supercritical fluid containing the dissolved metal chelates has been removed from the waste material, the pressure on the supercritical fluid can be reduced to below supercritical levels such that the fluid becomes a gas and the metal chelates are precipitated from the system. The pure metal can then be collected, and the chelating agent recycled. The chelating agent can be separated from the metal, for example, by the addition of 0.1 M or more concentrated nitric acid having a pH less than or equal to 1.

DETAILED DESCRIPTION

I. GENERAL DISCUSSION

The present invention concerns a method for extracting metals and/or metalloids from materials comprising the metals and/or metalloids, including extracting metals directly from oxides thereof, by exposing the material to a fluid solvent or a supercritical fluid solvent and at least one class of chelating agent. Typically, the fluid or supercritical fluid contains a chelating agent, or mixture of chelating agents, such as having a chelating agent dissolved in the fluid that forms a chelate with the metal or metalloid. The fluid also may include a solubility-enhancing agent.

A. Metals and Metalloids

The present invention is suitable for extracting or purifying many different types of metals and/or metalloids from materials. A metal is an element that forms positive ions in solutions, and produces oxides that form hydroxides rather than acids with water. Metals include, without limitation, alkali metals, alkali-earth metals, transition metals, noble metals (including the precious metals gold, platinum and silver), rare metals, rare-earth metals (lanthanides), actinides (including the transuranic metals), light metals, heavy metals, synthetic metals and radioactive metals. Specific examples are provided herein of extraction methods for separating actinides, lanthanides and transition metals from the corresponding metal oxides.

Metalloids are elements having both metallic and non-metallic properties. Examples of metalloids include, without limitation, arsenic, selenium and tellurium.

B. Extracting Fluids

Suitable fluids and/or supercritical fluids for use in the present invention include carbon dioxide, nitrogen, nitrous oxide, methane, ethylene, propane and propylene. Carbon dioxide is a particularly preferred fluid for both subcritical and supercritical fluid extractions because of its moderate chemical constants ($T_C$=31° C., $P_C$73 atm) and its inertness (i.e., it is non-explosive and thoroughly safe for extractions, even extractions performed at supercritical conditions). Carbon dioxide also is a preferred solvent because it is abundantly available and relatively inexpensive.

Figure 1:
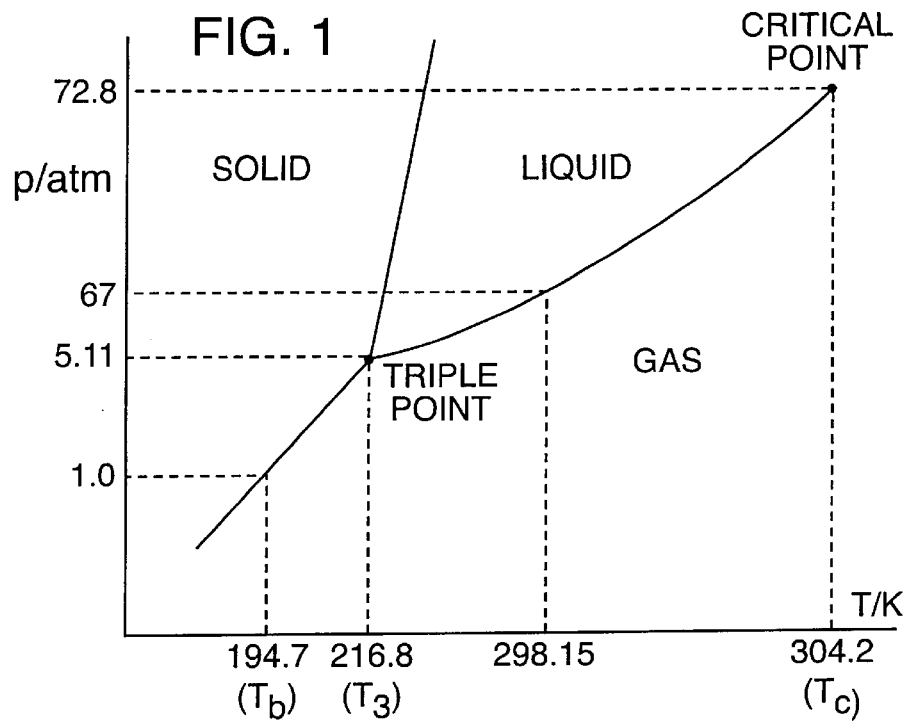
FIG. 1 is a phase diagram for carbon dioxide.

FIG. 1 is a phase diagram for carbon dioxide. FIG. 1 shows the conditions necessary to produce either subcritical liquid carbon dioxide or supercritical carbon dioxide. All conditions above the triple point ($T_P$) produce a supercritical carbon dioxide fluid solvent effective for practicing the present invention. However, virtually any conditions that are above the critical point are acceptable for producing a supercritical carbon dioxide fluid solvent useful for practicing the extraction process of the present invention.

Alternatively, liquid $CO_2$ may be suitable for use in the present invention. At room temperature carbon dioxide becomes a liquid above 5.1 atm. Depending on the pressure, liquid carbon dioxide has a density comparable or slightly greater than supercritical carbon dioxide, thus the solvation power of liquid carbon dioxide is comparable to that of supercritical carbon dioxide. This means liquid carbon dioxide should also be able to dissolve metal complexes. However, liquid carbon dioxide does not have the "gas-like" properties of supercritical carbon dioxide. This means that liquid carbon dioxide has a larger viscosity, smaller diffusivity, and consequently poorer penetration power compared to supercritical carbon dioxide. The extraction efficiency of liquid carbon dioxide is expected to depend on the applied pressure. It also is expected that the extraction efficiency with liquid $CO_2$ can be improved with agitation.

The fluid solvents of the present invention may be used either individually or in combinations, as mixed fluids or supercritical fluid solvents. Examples of suitable fluids, and their critical temperature and pressure, are shown in the following Table 1:

TABLE 1

PHYSICAL PROPERTIES OF SELECTED SUPERCRITICAL FLUIDS*

| Molecular Fluid | Formula | $T_c$ (° C.) | $p_c$ (atm) | $\rho_c$ (g/mL) | $\rho 400_{atm}$** |
|---|---|---|---|---|---|
| Carbon dioxide | $CO_2$ | 31.1 | 72.9 | 0.47 | 0.96 |
| Nitrous oxide | $N_2O$ | 36.5 | 71.7 | 0.45 | 0.94 |
| Ammonia | $NH_3$ | 132.5 | 112.5 | 0.24 | 0.40 |
| η-Pentane | $C_5H_{12}$ | 196.6 | 33.3 | 0.23 | 0.51 |
| η-Butane | $C_4H_{10}$ | 152.0 | 37.5 | 0.23 | 0.50 |
| η-Propane | $C_3H_6$ | 96.8 | 42.0 | 0.22 | — |
| Sulfur hexafluoride | $SF_6$ | 45.5 | 37.1 | 0.74 | 1.61 |
| Xenon | Xe | 16.6 | 58.4 | 1.10 | 2.30 |
| Dichlorodifluoromethane | $CCl_2F_2$ | 111.8 | 40.7 | 0.56 | 1.12 |
| Trifluoromethane | $CHF_3$ | 25.9 | 46.9 | 0.52 | — |
| Methanol | $CH_3OH$ | 240.5 | 78.9 | 0.27 | — |
| Ethanol | $C_2H_5OH$ | 243.4 | 63.0 | 0.28 | — |
| Isopropanol | $C_3H_7OH$ | 235.3 | 47.0 | 0.27 | — |
| Diethyl ether | $(C_2H_{25})_2O$ | 193.6 | 36.3 | 0.27 | — |
| Water | $H_2O$ | 374.1 | 218.3 | | |

*data from Matheson Gas Data Book (1980) and CRC Handbook of Chemistry and Physics (CRC Press, Boca Raton, Florida 1984).
**$T_r$ = 1.03

C. Solubility Modifiers

In addition, a modifier may be added to the fluid, including supercritical fluids, to vary the solvent characteristics thereof. For example, a modifier may be added to the fluid to enhance the solubility of a particular chelated metal or metalloid. Alternatively, a modifier might be added to the fluid to decrease the solubility of a chelate, or other material, in the supercritical fluid. The most useful modifiers are water and the low-to-medium boiling point alcohols and esters, such as the lower alkyl alcohols and esters. Typical modifiers may be selected from the group consisting of water, methanol, ethanol, ethyl acetate and the like. The modifiers typically are added to the fluids at proportions of between about 0.1% and 20.0% by weight. The modifiers contemplated for use herein are most typically not supercritical fluids at the disclosed operating conditions. Rather, the modifiers are simply dissolved in the fluid solvents, including the supercritical fluid solvents, to improve their solvent properties.

In one embodiment the chosen modifier is combined with a supercritical fluid at the described proportions prior to feeding the supercritical fluid to the extraction vessel. Alternatively, the supercritical fluid is fed to the extraction vessel without the modifier. The modifier is then introduced into the extraction vessel and thereby combined with the supercritical fluid.

D. Chelating Agents

A partial list of chelating agents (also referred to as ligands) useful for solubilizing metals and metalloids in supercritical fluids is provided by Table 2. The list is for illustration only. Other chelating agents, whether now known or hereafter discovered that are useful for forming metal and metalloid chelates, also may be used to practice the invention. Factors to consider for the selection of chelating agents include, but are not limited to: high stability constants of the metal complexes formed; fast complexation kinetics; good solubility of both chelating agent and complex formed in the supercritical fluid selected; and specificity to allow selective extraction of a metal or a group of metal ions.

TABLE 2

COMMONLY USED METAL CHELATING AGENTS

Oxygen Donating Chelating Agents

Cupferron
Chloroanillic acid and related reagents
β-diketones and related reagents
N-Benzoyl-N-phenylhydroxylamine and related reagents
Macrocyclic compounds Nitrogen Donating Chelating Agents α-dioximines
Diaminobenzidine and related reagents
Porphyrines and related reagents Oxygen and Nitrogen Donating Chelating Agents 8-Hydroxyquinoline
Nitrosonapthols and nitrosophenols
EDTA and other complexionates
Diphenylcarbazide and diphenylcarbazone
Azoazoxy BN Sulfur or Phosphorus Donating Chelating Agents Sodium diethyldithiocarbamate and related reagents
Dithizone and related reagents
Bismuthiol II
Thiothenoyltrifluoroacetone
Thioxine
Thiophosphinic acids
Phosphine Sulfides
Phosphorothioic acids
Tributylphoshpate and related reagents Without limiting the present invention, preferred chelating agents for practicing the method of the present invention include β-diketones; phosphine oxides, such as trialkylphosphine oxides, triarylphosphine oxides and alkylarylphosphine oxides; phosphinic acids; carboxylic acids; phosphates, such as trialkylphosphates, triarylphosphates and alkylarylphosphates; crown ethers; dithiocarbamates; phosphine sulfides; phosphorothioic acids; thiophosphinic acids; halogenated analogs of these chelating agents; and mixtures of these chelating agents. As used herein, the term "lower alkyl" refers to compounds having ten or fewer carbon atoms, and includes both straight-chain and branched-chain compounds and all stereoisomers. Alkyl-substituted chelating agents with chain lengths of about eight carbons, especially branched-chain alkyl groups, currently appear to exhibit the most favorable properties in terms of achieving high solubilities in supercritical carbon dioxide. Certain of the chelating agents currently considered useful for practicing the present invention are discussed in more detail below.

1. β-diketones

The carbon atoms of a ketone are assigned greek letters to designate positions along the carbon chain relative to the carbonyl carbon. The first carbon adjacent the carbonyl carbon is designated α, the second such carbon being designated β, and so on. A β-diketone has at least two ketone carbonyls wherein one ketone carbonyl is located on a carbon β to the other ketone functionality.

β-diketones used to practice the present invention generally satisfy the following Formula 1:

FORMULA 1

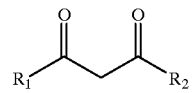

wherein $R_1$ and $R_2$ typically are independently selected from the group consisting of lower alkyl groups, halogenated lower alkyl groups, and thenoyl groups. As used herein, a "halogenated, lower alkyl group," such as a fluorinated ethyl group, means that at least one of the hydrogen atoms present on the alkyl group is replaced with a halogen atom, preferably a fluorine atom. A "halogenated lower alkyl group" also can refer to compounds wherein all, or any number, of the hydrogen atoms have been replaced with halogens, preferably fluorine atoms.

More specifically, $R_1$ and $R_2$ of Formula 1 are independently selected from the group consisting of methyl, fluorinated methyl, trifluoromethyl, ethyl, fluorinated ethyl, pentafluoromethyl, propyl, fluorinated propyl, heptafluoropropyl, butyl, fluorinated butyl and nonafluorobutyl. Specific examples of suitable β-diketones include, without limitation, acetylacetone, dibutyldiacetate, trifluoroacetylacetone, hexafluoroacetylacetone, thenoyltrifluoroacetylacetone and heptafluorobutanoylpivaroylmethane. Especially preferred β-diketones include hexafluoroacetylacetone and dibutyldiacetate.

In preferred embodiments, the ligand is halogenated to enhance the solubility of the metal-ligand complex in supercritical carbon dioxide. In especially preferred embodiments, the ligand is fluorinated. The solubilities of some halogenated metal-ligand complexes in supercritical carbon dioxide, and in particular the fluorinated metal-ligand complexes, are enhanced by two to three orders of magnitude relative to the corresponding non-halogenated metal-ligand complexes. For illustrative purposes only, and without limiting the present invention, a suitable fluorinated ligand is shown below.

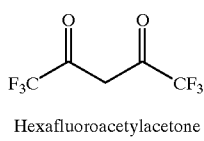

Hexafluoroacetylacetone

A number of fluorinated β-diketones are commercially available from such companies as Aldrich Chemical Company of Milwaukee, Wis. These β-diketones form stable complexes with metals, including lanthanides and actinides, and hence are useful ligands for extracting metals from metal oxides. Extraction and separation of actinides by supercritical fluids are of particular interest because of the potential applications for nuclear waste analysis and management.

Several fluorinated β-diketones have been used for the extraction of uranyl and Th(IV) ions using carbon dioxide fluid solvents as shown below in Table 3. All β-diketones tested, except TTA, are liquids at room temperature and at atmospheric pressure.

TABLE 3

Fluorinated β-diketones Used for the Extraction of Metal Ions Using Supercritical Carbon Dioxide

| β-diketone | Abbr. | $R_1$ | $R_2$ | Mol. Wt. | BP |
|---|---|---|---|---|---|
| Acetylacetone (760 Torr) | AA | $CH_3$ | $CH_3$ | 100.12 | 139° |
| Trifluoro-acetylacetone | TAA | $CH_3$ | $CF_3$ | 154.09 | 107° |
| Hexafluoro-acetylacetone | HFA | $CF_3$ | $CF_3$ | 208.06 | 70–71° |
| Thenoyltri-fluoroacetone (9 Torr) | TTA | Thenoyl | $CF_3$ | 222.18 | 103–104° |
| Heptafluorobutanoyl-pivaroylmethane (2.7 Torr) | FOD | $C(CH_3)_3$ | $C_3F_7$ | 296.18 | 33° |

The fluorinated beta-diketones were purchased from the Aldrich Chemical Company of Milwaukee, WI, and were used without further purification.

β-diketones exist in at least two tautomeric forms, the "keto" tautomer and the "enol" tautomer. Tautomerism is a type of isomerism in which migration of a hydrogen atom results in two or more structures called tautomers. β-diketones react with metal ions to form chelates either through the enol tautomer or through an enolate anion (a negatively charged "enol" form of the molecule) illustrated by the following equilibria:

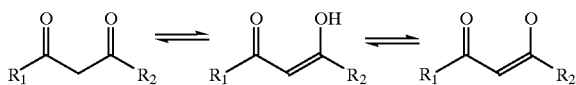

The presence of a small amount of water has been found to significantly increase the $CO_2$ extraction efficiency of metal ions from a solid support using fluorinated β-diketones as an extractant. Without limiting the invention to one theory of operation, water molecules likely form adducts with the metal/β-diketone complex. One skilled in the art will realize that the amount of water used during the extraction process may vary. However, where about 10 μg of metal ion is to be extracted, at least about 10 μL of water should be added to the system prior to the extraction process. In other words, it appears sufficient to use about 1 μL of water per 1 μg of metal ion.

2. Phosphinic Acids as Ligands

As used herein, "phosphinic acid" refers to an organic derivative of hypophosphorous acid [$HP(OH)_2$]. The phosphinic acid ligands generally considered useful for practicing the method of the present invention typically satisfy the following Formula 2:

FORMULA 2

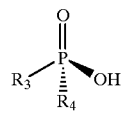

wherein $R_3$ and $R_4$ are independently selected from the group consisting of lower alkyl, halogenated lower alkyl, aryl, halogenated aryl, thenoyl, and mixtures thereof. $R_3$ and $R_4$ preferably are selected from the group consisting of lower alkyl and fluorinated lower alkyl groups. One example, without limitation, of a suitable phosphinic acid chelating agent is bis(2,4,4-trimethylpentyl)phosphinic acid as shown below.

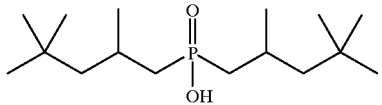

Bis(2,4,4-trimethylpentyl)phosphinic acid

Thiophosphinic acids also have proved useful for supercritical fluid extraction. Examples, without limitation, of thiophosphinic acids include bis(2,4,4-trimethylpentyl) monothiophosphinic acid, bis(2,4,4-trimethylpentyl)-dithiophosphinic acid, and analogs thereof 3. Carboxylic Acids as Ligands The carboxylic acids generally useful for practicing the method of the present invention typically satisfy the following Formula 3:

FORMULA 3

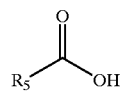

wherein R5 generally is selected from the group consisting of lower alkyl, halogenated lower alkyl, aryls, halogenated aryls, halogenated aryls and thenoyl groups.

Examples, without limitation, of carboxylic acids that satisfy this formula include methanoic acid, also referred to as formic acid, ethanoic acid, propanoic acid, butanoic acid, pentanoic acid, hexanoic acid, heptanoic acid, octanoic acid, nonionic acid, decanoic acid, and branched analogs of these compounds. Unsaturated carboxylic acids, such as acrylic or methacrylic acid, as well as cyclic carboxylic acids, such as cyclohexanecarboxylic acid, also can be used as suitable chelating agents, as long as such acids form chelates with the metal or metalloid. Halogenated forms of the alkyl, unsaturated alkyl and cyclic carboxylic acids also can be used as chelating agents. Examples, without limitation, of aryl carboxylic acids suitable as chelating agents include benzoic acid and phenylacetic acid, as well as halogenated derivatives thereof.

4. Phosphates as Ligands

The phosphates generally useful for practicing the method of the present invention typically satisfy the following Formula 4:

FORMULA 4

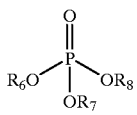

wherein $R_6$–$R_8$ are independently selected from the group consisting of lower alkyl groups and aryl groups.

5. Crown Ethers as Ligands

Crown ethers generally useful for practicing the method of the present invention typically satisfy the following Formula 5:

FORMULA 5

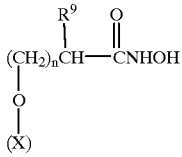

wherein X is a dibenzo crown ether of the formula dibenzo [13+3m]-crown-[4+m] ether, and m is an integer of from 0 to about 5, n is an integer from 0 to 6, and $R_9$ is H or a lipophilic hydrocarbyl group having from 1 to about 18 carbon atoms and is selected from the group consisting of alkyl, cycloalkyl, alkenyl and aryl groups. In more preferred embodiments, the crown ether is represented by Formula 6:

FORMULA 6

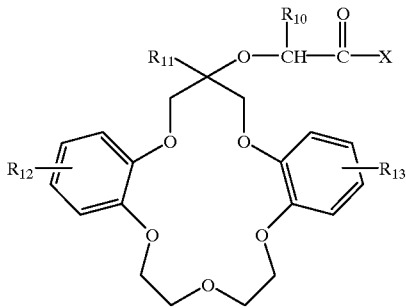

wherein X is OH or NHOH; $R_{10}$ is alkyl, halogenated alky, phenyl or halogenated phenyl; $R_{11}$ is alkyl, halogenated alkyl; $R_{12}$ is H or a halogen; and $R_{13}$ is H or a halogen.

6. Dithiocarbamates as Ligands

Dithiocarbamates generally useful for practicing the method of the present invention typically satisfy the following Formula 7:

FORMULA 7

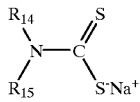

wherein $R_{14}$ and $R_{15}$ are alkyl or aromatic groups containing one or more halogen atoms.

For extracting metals directly from metal oxides, the chelating agents of the present invention preferably are protic chelating agents, i.e., are capable of donating protons. The donation of a proton to the metal oxide apparently sufficiently frees the metal from the metal-oxide lattice so that the metal can form chelates with the chelating agent. Without limiting the invention, chelating agents that appear particularly useful for forming chelates with the metal of metal oxides include the β-diketones and related halogenated reagents, the phosphinic acids and related halogenated reagents, and the carboxylic acids and related halogenated reagents.

Mixtures of chelating agents have proved particularly useful for extractng metals and/or metalloids from other materials using supercritical fluid extraction. Without limiting the present invention, it currently is believed that the intially formed metal and/or metalloid chelates typically also include at least one water molecule complexed with the metal chelate. This tends to increase the polarity of the metal chelate as water is a relatively polar molecule. But, by then exposing the initially formed metal chelate to a different chelating agent than that used to form the initial metal chelate, it has proved possible to displace the water molecule with a second class of chelating agent, thereby substantially increasing the solubility of the metal chelate in supercritical fluid extraction. Metals or metalloids having at least two different classes of ligands coupled thereto are referred to herein as adducts.

A person of ordinary skill in the art will realize that the selection of a chelating agent, or mixture of chelating agents, will depend on a number of factors, including the ability to form chelates with a particular metal or metalloid of interest, availability, toxicity, etc. The selection of a second, different chelating agent for displacing water also can vary. It currently appears that Lewis base chelating agents are preferred materials for use as the second chelating agent in a process using plural chelating agents for the formation of adducts. For example, phosphorous-containing chelating agents, such as phosphates and phosphinic acids, preferably phosphates, have been found to be particularly good at displacing water molecules from the intially-formed metal chelate.

II. EXAMPLES

The following examples are provided solely to illustrate certain embodiments of the invention. The invention should not be limited to the particular embodiments discussed in the examples. For instance, the examples illustrate the use of fluorinated ligands, but the invention should not be limited to just fluorinated compounds. Non-fluorinated ligands, including other halogenated ligands, also perform satisfactorily.

A. Extracting Metals or Metalloids from Oxides Thereof

Example I

This example describes extracting a transition metal from a transition metal oxide. More specifically, this example describes the extraction of iron from iron oxide using thenoyltrifluoroacetone (TTA) as the chelating agent and supercritical $CO_2$ modified with methanol as the extraction solvent. One gram of ferric oxide ($Fe_2O_3$) and 100 mg TTA were added to a 20 ml extraction cell of an ISCO oven system along with 50 μl $H_2O$. The $Fe_2O_3$ was obtained from Fisher Chemicals. TTA was obtained from Aldrich Chemical Company of Milwaukee, Wis. The vessel was heated to 60° C., pressurized with supercritical $CO_2$ supplied at 3000 psi by an ISCO 2600 syringe pump and sealed for five minutes to allow time for Fe(III)/TTA chelates to form. The $CO_2$ had been modified by addition of methanol to form a 5% (v/v) methanol:$CO_2$ solution before injection into the extraction vessel.

After five minutes, a dark red extract was collected and the procedure repeated until the extract became clear. The extract solution was then analyzed spectrophotometrically to determine whether chelated iron had been obtained by direct treatment of the iron oxide with TTA and supercritical $CO_2$. The UV spectra gave a large UV peak from 230 nm to 400 nm and a visible peak at 490 nm, which indicated the presence of Fe(III)/β-diketone complexes.

The following examples describe the extraction of actinides from actinide oxides, and in particular the extraction of uranium from uranium oxides, using fluorinated β-diketones. Examples II–IV describe a static extraction method in which an extraction cell containing uranium oxide and a β-diketone is heated, pressurized with $CO_2$ and sealed. After allowing a period of time for the uranium to form chelates with the β-diketones, the extraction cell is dynamically flushed with supercritical $CO_2$, sweeping the uranium chelates dissolved in the $CO_2$ into a collection vessel. Example V describes a more preferred dynamic extraction method in which pressurized $CO_2$ containing a known concentration of β-diketone is continuously flowed over a uranium oxide sample.

1. Static Extraction

Example II

This example describes the extraction of uranium from $U_3O_8$ using only $CO_2$ and TTA. The $U_3O_8$ and TTA were obtained from Aldrich Chemical Company of Milwaukee, Wis. Liquid $CO_2$, SFC grade, was obtained from Scott Specialty Gases. $U_3O_8$ and TTA were added directly to the 20 ml extraction cell of an ISCO oven system in the amounts shown in Table III below. The cell was heated to 60° C. and pressurized with $CO_2$ supplied at 2250 psi by an ISCO 2600 syringe pump. A period of ten minutes was allowed for chelates to form and solubilize in the $CO_2$. The extraction cell was then dynamically flushed with $CO_2$ for ten minutes and the extracted complexes were collected in chloroform.

Samples and standards were analyzed by nuclear activation analysis (NAA). This procedure comprises irradiating both samples and standards for 1 hour in a 1 MW Triga nuclear reactor at a steady flux of $6 \times 10^{12}$ $ncm^{-2}S^{-1}$. After irradiation, the samples were cooled for 48 hours before counting. Each sample was counted for 60 seconds in a large volume ORTEC Ge (Li) detector with a resolution (FWHM) of approximately 2.3 KeV at the 1332 $KeV^{60}CO$ peak. Uranium was determined by the 228 KeV γ-ray emitted during the decay of its daughter $^{239}Np$ ($t_{1/2}$=2.36 d). Uranium samples were back extracted from the chloroform collection solvent into 50% M $HNO_3$ solution and made up to 3 ml. 250 μL of this was taken for NAA. Analysis was carried out by comparing count ratios against standard solutions.

As shown in Table 4 below, significant amounts of uranium were obtained from the 10 mg $U_3O_8$ samples. The remaining $U_3O_8$ had changed color to a deep orange, indicating that substantially more uranyl/TTA complex had formed than had been extracted under the relatively mild temperature and pressure conditions used.

Example III

This example describes the extraction of $U_3O_8$ using $CO_2$, TTA and $H_2O$. Reaction conditions and procedures were substantially as described above in Example II, except that about 1 μl of water was added for every 1 μg of metal. The water was added to the extraction cell before the cell was heated and pressurized with $CO_2$. Samples and standards were analyzed as described in Example II above. The results, in terms of amounts of uranium extracted, are shown in Table 4 below.

Example IV

This example describes the extraction of $U_3O_8$ using TTA, $CO_2$, $H_2O$, and HPLC-grade methanol. Reaction conditions and procedures were substantially the same as in Examples II and III above. Methanol was added to water to form a 5% (v/v) water:methanol solution before the extraction cell was heated and pressurized with $CO_2$. Samples and standards were analyzed as in Examples II and III above. The results, in terms of the amount of uranium extracted, are shown in Table 4 below.

TABLE 4

| Conditions | mg $U_3O_8$ | mg U | mg U extracted |
|---|---|---|---|
| 100 mg TTA | 13.5 | 11.21 | 0.04 |
| 60° C., 2250 psi | 12.0 | 9.96 | 0.10 |
| neat $CO_2$ | 11.5 | 9.54 | 0.16 |
| 10 min static | 15.0 | 12.45 | 0.63 |
| 10 min dynamic | 10.3 | 8.54 | 0.08 |
| | 11.6 | 9.60 | 0.26 |
| 100 mg TTA | 12.3 | 10.2 | 0.29 |
| 60° C., 2250 psi | 10.0 | 8.3 | 0.18 |
| $H_2O$ modified $CO_2$ | 11.0 | 9.21 | 0.05 |
| 10 min static | 10.8 | 8.96 | 0.10 |
| 10 min dynamic | 10.3 | 8.55 | 0.16 |
| 100 mg TTA | 9.5 | 7.9 | 0.15 |
| 60° C., 2250 psi | 14.6 | 12.0 | 0.30 |
| 5% MeOH v/v + $H_2O$ + | 12.6 | 10.5 | 0.31 |
| $CO_2$ | 12.0 | 9.96 | 0.10 |
| 10 min static | 12.5 | 10.3 | 0.11 |
| 10 min dynamic | 10.6 | 8.8 | 0.37 |

Table 4 shows the amounts of uranium extracted from several $U_3O_8$ samples under the experimental conditions described in Examples II–IV. In the four columns of Table 4 from left to right are listed: (1) a summary of the reaction conditions, (2) the $U_3O_8$ sample sizes in milligrams, (3) the number of milligrams of uranium calculated to be present in each $U_3O_8$ sample, and (4) the amount of uranium extracted from each sample in milligrams. In each case, the remaining $U_3O_8$ had changed color to a deep orange, indicating that substantially more uranyl/TTA chelates had formed than had been extracted under the relatively mild temperature and pressure conditions used. It is believed that substantially more metal would be extracted under conditions of higher temperature and/or pressure.

2. Dynamic Extraction

Example V

Figure 2:
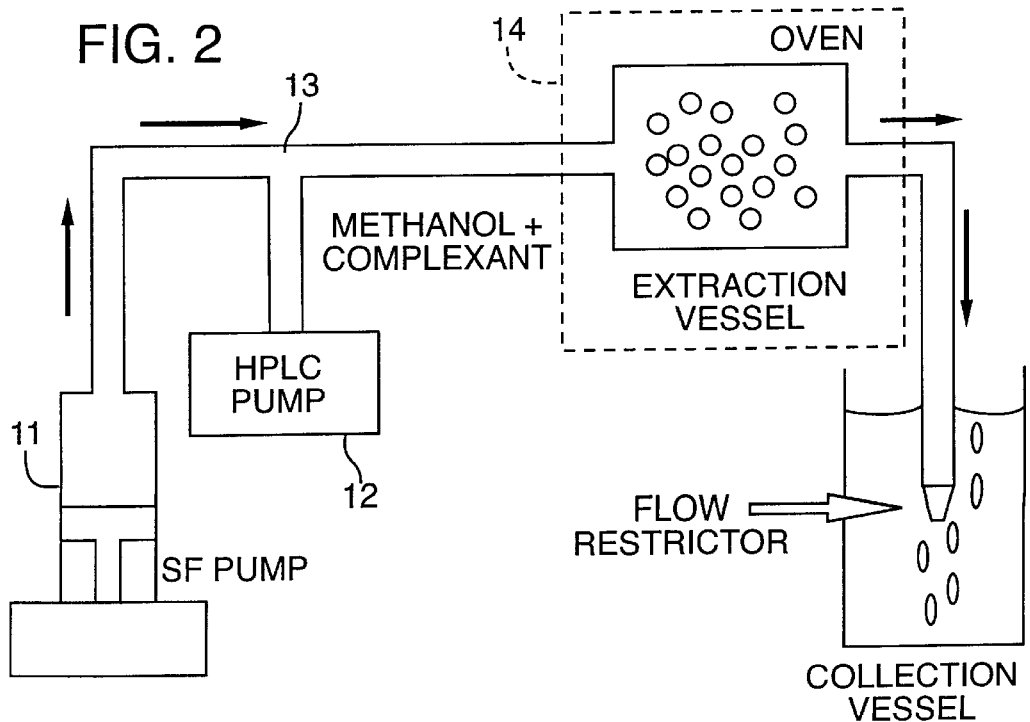
FIG. 2 is a schematic drawing of a system for extracting metal from metal oxides in accordance with the present invention.

This example describes a method for extracting uranium from uranium oxide using dynamic extraction, i.e., continuously flowing HFA dissolved in supercritical $CO_2$ over a $UO_2$ sample, according to the system depicted in FIG. 2. An ISCO 2600 syringe pump 11 was used to supply liquid $CO_2$ at 2250 psi. A Kratos HPLC pump 12 supplied methanol containing dissolved HFA. The methanol mixed with the liquid $CO_2$ under pressure via a "T" junction 13. The mixture was flowed into the ISCO oven system 14 containing the $UO_2$ sample. In some experiments, the $UO_2$ was ground to increase the surface area available for reaction, as indicated in Table 5 below.

The methanol was added to the $CO_2$ as 16% (v/v) methanol:$CO_2$ solution. Concentrations of HFA in the supercritical fluid were 10 µl/ml to 30 µl/ml. This equates to $1.67 \times 10^{-3}$ mg HFA (at 10 µl) per ml of liquid $CO_2$+16% MeOH. However, since the density of the supercritical fluid phase varies with temperature and pressure, the actual concentrations of HFA under specific experimental conditions were calculated in order to determine the rates of reaction. The results of these calculations are shown in Tables 5 and 6 below. The actual concentration of HFA under supercritical fluid conditions was estimated by using a density calculation for $CO_2$/MeOH system at 10% MeOH. These were obtained from a "SF-solver program" available from the ISCO company. The density of the liquid $CO_2$/MeOH system was taken as 1 mg.ml.

Samples and standards were analyzed as described above in Example II. The amounts of uranium extracted from $UO_2$ are shown in Table 6 below. The interfacial kinetics of the uranium dissolution were calculated according to the equations given below, the results of which also are shown in Table 6:

$$R = KA[HFA] \quad \text{EQUATION 1}$$

where K is the rate constant at temperature T, R is the rate of uranium dissolution, and A is the area of $UO_2$ (assumed to be 1 cm$^2$); and $$K = R/A[HFA] \quad \text{EQUATION 2}$$

Rate constants calculated using equation (2) are shown in Table 6. The rate constants are expressed in terms of grams of uranium dissolved per second per molar concentration of HFA per square centimeter of oxide surface.

TABLE 5

| % Concentration HFA | SF Conditions ° C. & psi | SF Density g/ml | Concentration in mol/l in SF |
|---|---|---|---|
| $1.67 \times 10^{-3}$ | 60,2250 | 0.75 | $6.20 \times 10^{-6}$ |
| $3.34 \times 10^{-3}$ | 60,2250 | 0.75 | $1.24 \times 10^{-5}$ |
| $5.01 \times 10^{-3}$ | 60,2250 | 0.75 | $1.86 \times 10^{-5}$ |
| $1.67 \times 10^{-3}$ | 90,2250 | 0.5 | $4.14 \times 10^{-6}$ |
| $3.34 \times 10^{-3}$ | 90,2250 | 0.5 | $8.28 \times 10^{-6}$ |
| $5.01 \times 10^{-3}$ | 90,2250 | 0.5 | $1.24 \times 10^{-5}$ |
| $1.67 \times 10^{-3}$ | 120,2250 | 0.32 | $2.65 \times 10^{-6}$ |
| $3.34 \times 10^{-3}$ | 120,2250 | 0.32 | $5.29 \times 10^{-6}$ |
| $5.01 \times 10^{-3}$ | 120,2250 | 0.32 | $7.94 \times 10^{-6}$ |

TABLE 6

| Conditions | Sample Type | Mass U extracted in µg | Rate µg/min | HFA conc/µg/m $CO_2$ | Interfacial rate of U dissolution g S$^{-1}$ mol$^{-1}$ Lcm$^2$ |
|---|---|---|---|---|---|
| 60° C. | $UO_2$ as received | 10.92 | $3.00 \times 10^{-9}$ | $1.67 \times 10^{-3}$ | |
| 90° C. | | 37.68 | $1.05 \times 10^{-8}$ | | |
| 120° C. | | 64.08 | $1.78 \times 10^{-8}$ | | |
| 60° C. | ground $UO_2$ | 5.66 | $1.50 \times 10^{-9}$ | $1.67 \times 10^{-3}$ | $2.42 \times 10^{-4}$ |
| 90° C. | | 46.0 | $1.28 \times 10^{-8}$ | | $3.09 \times 10^{-3}$ |
| 120° C. | | 186.0 | $5.17 \times 10^{-8}$ | | $1.95 \times 10^{-2}$ |
| 60° C. | ground $UO_2$ | 106.7 | $2.97 \times 10^{-8}$ | $3.34 \times 10^{-3}$ | $2.40 \times 10^{-3}$ |
| 90° C. | | 173.2 | $4.82 \times 10^{-8}$ | | $5.82 \times 10^{-3}$ |
| 120° C. | | 121.6 | $3.38 \times 10^{-8}$ | | $6.39 \times 10^{-3}$ |
| 60° C. | ground $UO_2$ | 48.3 | $1.35 \times 10^{-8}$ | $5.01 \times 10^{-3}$ | $7.26 \times 10^{-4}$ |
| 90° C. | | 195.3 | $5.43 \times 10^{-8}$ | | $4.38 \times 10^{-3}$ |
| 120° C. | | 118.5 | $3.30 \times 10^{-8}$ | | $4.16 \times 10^{-3}$ |

Table 5 shows actual concentrations of HFA in supercritical $CO_2$ (modified with methanol to form a 16% (v/v) methanol:$CO_2$ solution) at varying temperature and pressure conditions. In the four columns of Table 5 from left to right are listed: (1) HFA concentrations in 16% (v/v) methanol:$CO_2$ solutions before the $CO_2$ is placed under heat and pressure conditions; (2) the temperatures and pressures applied to the HFA/$CO_2$/methanol solutions; (3) the density of the supercritical $CO_2$ under heat and pressure conditions; and (4) actual HFA concentrations under heat and pressure conditions.

Table 6 shows the interfacial rate of uranium dissolution for ground uranium oxide samples using actual HFA concentrations. Dissolution rates were calculated according to Equations 1 and 2 above.

Figure 3:
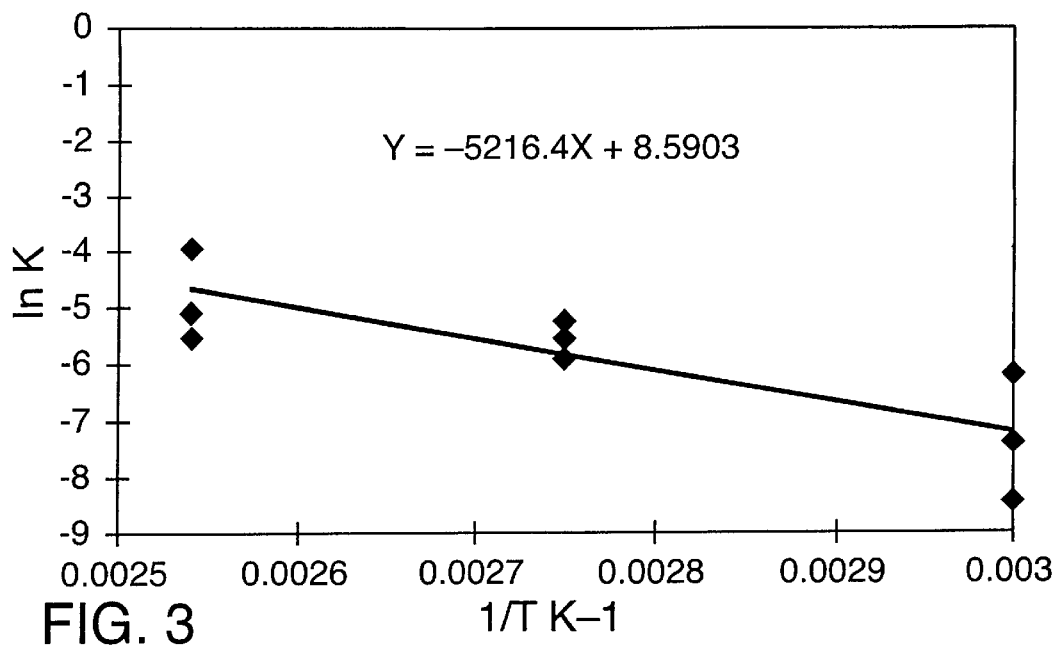
FIG. 3 is an Arrhenius plot showing the energy of activation for uranium oxide dissolution at varying hexafluoroacetylacetone (HFA) concentrations according to the embodiment described in Example IV.

The foregoing data is expressed as an Arrhenius plot in FIG. 3 for the data obtained at all HFA concentrations.

B. Specific Waste-Treatment Embodiment

Example VI

Figure 4:
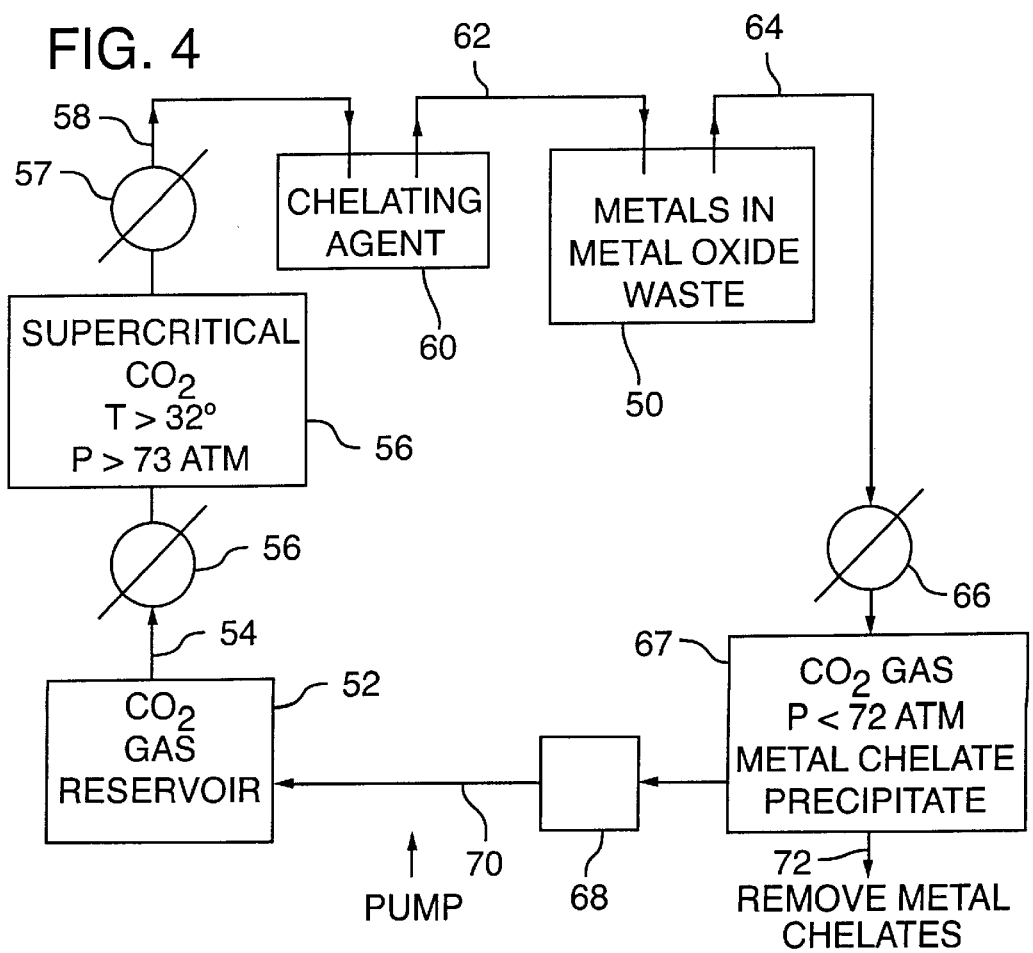
FIG. 4 is a schematic drawing of a waste treatment system in accordance with the present invention.

One proposed embodiment for a continuous selective-chelation supercritical fluid-extraction process is illustrated in FIG. 4. This process is suitable for chelating metals that are contained in metal oxide held in a container 50. A supercritical fluid, such as carbon dioxide gas, is supplied from a $CO_2$ gas reservoir 52. Reservoir 52 is connected by a conduit 54 containing a valve 55 to a pressurization unit 56 that increases the pressure on the gas to greater than 73 atmospheres at a temperature greater than 32° C. to form supercritical carbon dioxide. The supercritical $CO_2$ then travels through a valve 57 and conduit 58 to a reservoir 60 that holds a chelating agent, such as any of the agents listed or described in this specification as suitable for the present invention. The $CO_2$ is there passed through a column containing a chelating reagent to dissolve the chelating agent into the supercritical fluid $CO_2$ stream. The supercritical fluid and chelating agent leave reservoir 60 through a conduit 62 and are introduced into container 50.

The supercritical fluid/chelating agent is intimately mixed with the metal oxide in container 50 using either a batch or continuous process. In a batch process, simple mixing would occur through stirring or sonication. Alternatively, mixing could occur by allowing $CO_2$ to flow through a column of metal oxide waste. In a continuous mixing embodiment, $CO_2$ would flow through a column of metal oxide waste.

After mixing, $CO_2$ containing the metal chelate is removed through a conduit 64. A depressurizer valve 66 is present in line 64 to reduce the pressure to below seventy-two atmospheres such that the metal chelate precipitates in container 67. The $CO_2$ gas is then recycled by pump 68 through line 70 to gas reservoir 52. Metal chelates can be removed from the bottom of container 67 through line 72 such that the chelating agent can be regenerated from the metal chelate. When regeneration of the chelating agent is desired, metal ions can be stripped from the chelate using a nitric acid solution having a pH less than one.

The extraction system should be thermally controlled, either by known electrical means or immersion in a constant temperature bath. Thermal control allows the carbon dioxide or other supercritical fluid to be maintained above its supercritical temperature.

C. Separation of Metal From Impurities

The present invention further provides a method for purifying metal or metalloid from unreacted chelating agents and from other metal chelates or impurities present initially in a mixture of formed during supercritical fluid extraction (or "SFE").

In accordance with this method, certain properties of the supercritical fluid (such as pressure) are varied to achieve a solvating region which is favorable to the solubility of one particular component or metal chelate in a mixture of components or metal chelates. The increased or enhanced solubility of one component also can be utilized to inhibit the uptake or solubility of other components in order to further separate the components, i.e., to separate the impurities from the desired metal or metal chelate. Further, in addition to varying the solvent power or strength of the supercritical fluid, the volatility of metal complexes can be controlled to achieve separation from other metal complexes.

In further accordance with the present invention, the solubility differential between the desired metal (or metal chelate) and an impurity is relied upon to separate and purify the desired components. In this manner, a less-soluble desired metal chelate complex can be separated from a more-soluble metal chelate impurity. In yet another aspect, adduct forming agents are added to form adducts of desired metal chelates to make them more soluble for transport in supercritical fluid, and thus are easier to separate and purify from impurities.

The present invention can be used, for instance, in connection with the separation of metals extracted directly from metal oxides by supercritical fluid extraction. In one illustrative embodiment, uranium is separated by a method of the present invention after being directly extracted from $UO_3$. The metal oxide, $UO_2(NO_3)_2$, can also be used. The present invention, however, is also suitable for use with the extraction of thorium from thorium oxide, or the extraction of other metals from metal oxides, such as plutonium from plutonium oxide.

The metal oxides, chelating agents, supercritical fluids, and other reagents discussed above are likewise suitable for this aspect of the present invention. Preferably, however, for the extraction and separation of uranium, supercritical carbon dioxide is utilized along with a protic chelating agent.

Semivolatile metal chelate complexes formed by SFE can be separated into different fractions based on differing solubilities in supercritical fluid, particularly supercritical carbon dioxide fluid (or supercritical fluid $CO_2$). The ability to vary the solvating power of supercritical fluids by varying their physical conditions in order to extract and separate certain metals is especially beneficial in connection with extracting and separating nuclear materials without creating significant secondary waste streams.

Supercritical fluid is most effective as a solvent for a large number of semivolatile compounds which would otherwise decompose if high temperatures were used as a means for their separation. Hence, the varying solvent power of SF can be utilized in combination with ligand selectivity to facilitate the extraction and separation of metal complexes.

One way to represent the solvent power of supercritical fluid (where the solid solute is treated as a subcooled liquid) uses a solubility parameter, and in most cases the Hidlebrand parameter, δ, is used. The solubility behavior of analytes in supercritical fluids can be semiquantitively related to the δ ($\delta_{sf}$ of the supercritical fluid, $$\delta_{sf} = 1.25 P_c^{1/2}(\rho_f/\rho_l)$$

where $P_c$=critical pressure of the solvent, $\rho_f$=the reduced density of the supercritical fluid, and $\rho_l$=the reduced density of the fluid in the liquid state, which is close to 2.66. In general, the larger the $\delta_{sf}$ value, the more soluble a solute is at any given temperature.

Figure 6:
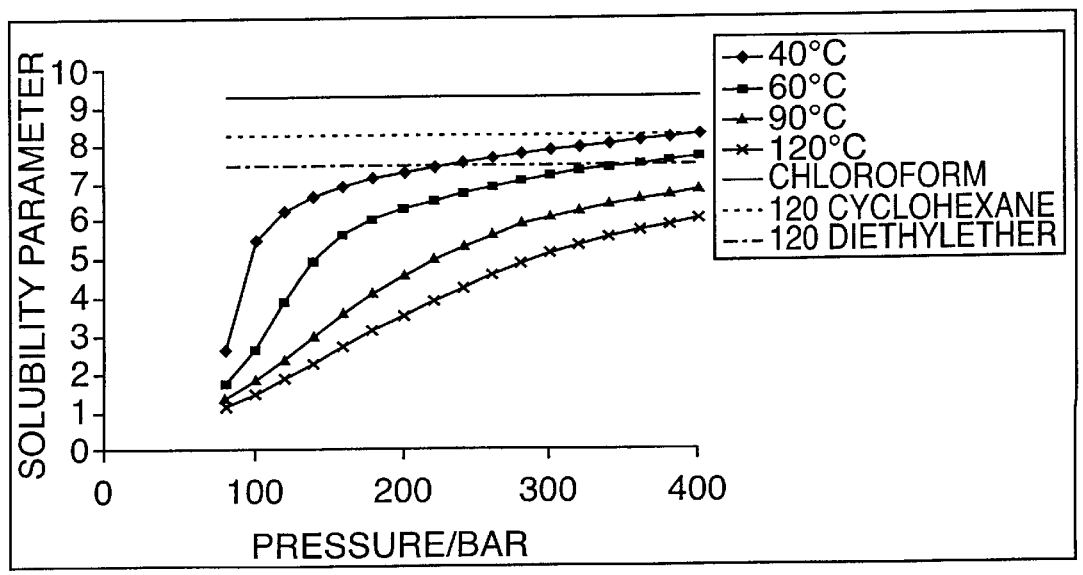
FIG. 6 is a comparison of the solubility parameter of SF $CO_2$ with those of conventional solvents.

The $\delta_{sf}$ of supercritical fluid $CO_2$ under varying conditions is shown in FIG. 6. (FIG. 6 is a comparison of the solubility parameter of supercritical fluid $CO_2$ with those of conventional solvents. The data for the conventional solvents is for 25° C. and 1 atm pressure, and the conditions for supercritical fluid $CO_2$ are as shown.) It was observed that changing the physical conditions of the supercritical fluid $CO_2$ greatly influenced the solvating ability of the fluid. As represented in FIG. 6, under certain conditions, supercritical fluid $CO_2$ can approach or exceed the solvent power of these solvents.

The magnitude of a solutes solubility in a supercritical fluid is not only related to the solvating power of the solvent but also to the volatility of the solute. Therefore, compounds of high volatility tend to show higher solubility in supercritical fluid $CO_2$ than those with low volatility.

Hence, since the solvent power or strength of supercritical fluids, such as supercritical fluid $CO_2$, and the volatility of compounds, such as metal complexes, can be controlled, then very selective extraction and purification processes are feasible. As discussed herein, the properties of supercritical fluids, such as supercritical fluid $CO_2$, can be varied such that separation of differing metals (or metal chelate complexes) can be achieved.

In one embodiment, detailed below, a uranyl/TTA complex is first prepared by exposing $UO_3$ to supercritical fluid $CO_2$ containing dissolved TTA. The metal complex is then purified by separating it from unreacted TTA ligand and other metal ion contaminants (such as iron) that likely are present based on the differing solubilities of these various components in supercritical fluid $CO_2$.

Example VIII

Reagents

The following reagents were used in this example: uranium trioxide ($UO_3$; Alfa Aesar, UK), thorium oxide (Alfa Aesar, UK), TTA (Aldrich, Milwaukee, Wis.), iron (III) chloride, copper nitrate, tributyl phosphate ("TBP") (Aldrich, Milwaukee, Wis.), sea sand, $HNO_3$, and $CHCl_3$ (Fisher Certified ACS, Fairlawn, N.J.), and methanol. These reagents were used as received. Carbon dioxide (Air Products, Allentown, Pa., SFE/SFC grade) was used in the extractions.

Equipment

Figure 5:
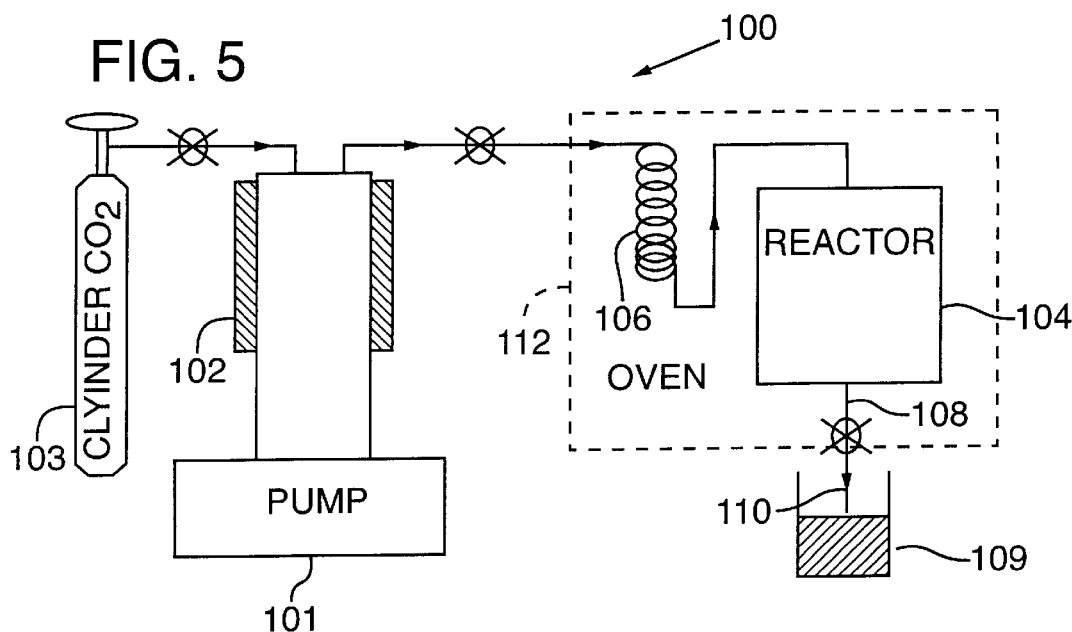
FIG. 5 is a schematic drawing of a reaction system utilized in connection with the present invention.

As schematically illustrated in FIG. 5, the extraction system 100 utilized a 260D syringe pump 101 (ISCO, Lincoln, Nebr.) equipped with a cooling jacket 102 (controlled at 5° C.) for liquefying carbon dioxide 103. A SX 2-10 extractor 104 (ISCO, Lincoln, Nebr.) was used with 9 ml volume PEEK sample cartridges (ISCO, Lincoln, Nebr.). For reaction kinetic studies, a complete PEEK system was utilized consisting of a 10 ml PEEK extraction cell or reactor (Altech, Deerfield, Ill.), connected to PEEK 1/16th inch tubing 106. The exit stream 108 from the system (to a ligand collector 109) was controlled via a 0.05 mm (id) capillary restrictor 110 (JW Scientific, Folsom, Calif.). A micro cutting torch was used in sealing the capillary restrictors. This system was placed inside a heater system 112 consisting of a stainless steel tube surrounded by heat tape (Omegalux, Stanford, Conn.). The temperature of the reactor was monitored using a thermocouple (Omegalux, Stanford, Conn.) attached to the outside of the reaction cell. A UV-vis spectrometer was used for $Fe(TTA)_3$ analysis. Extracted samples were collected in 10 ml test tubes and placed into 25 ml sealed teflon vessels. Uranium analysis was performed using a Perkin Elmer Scienx ELAN 5000 ICP-MS (Norwalk, Conn.) equipped with a Gilson 212 autosampler (Middleton, Wis.).

Procedures

Initially, glass wool was placed in the reactor, followed by a weighed amount (~0.1 g) of $UO_3$, 0.5 ml of methanol, and 0.01 ml of $H_2O$. The top of the extraction cell was filled with glass wool. The system was placed in the heated zone and pressurized with supercritical fluid $CO_2$ to the desired value. The temperature was controlled to ±2° C. The end of the restrictor was initially sealed, using a micro cutting torch. The reaction proceeded for 20 minutes in a static mode (no $CO_2$ flow). After 20 minutes, the sealed end of the capillary was broken and the $CO_2$ allowed to flush the reaction cell. The reaction cell was flushed for 20 minutes at the same pressure as the reaction, then depressurized slowly to atmospheric pressure.

The reaction efficiency was determined by washing the product with $CHCl_3$ to dissolve the complex formed. The unreacted $UO_3$ was then dissolved in nitric acid solution. The samples were then analyzed by the ICP-MS, using the following conditions: rf power 1kW; and plasma argon, 15 L/min. Uranium was analyzed using $^{238}U$ isotope since it has the largest abundance (99.27%) and is free from interferences from other elements. Analyses were performed using external calibration, which was repeated every 10 samples. Blanks and standards were prepared in 1% $HNO_3$, and samples were diluted with 1% $HNO_3$ to bring the concentration within the range of 1 to 100 ppb. Accuracy of this method is <1.5% determined by analysis of standard reference materials.

Solubility of $Fe(TTA)_3$ was determined using a previously known system consisting of a dual pumping system, extraction cell, and solvent trapping system. (The ISCO syringe pump has an electronically controlled stepping motor which provides for a high accuracy flow rate monitor.) $Fe(TTA)_3$ (~0.5 g) was loaded into the extraction cell and mixed with glass beads (60/80 mesh) to prevent sample compaction. Pure $CO_2$ was flowed through the cell at a flow rate <1 ml/min. The $CO_2$ flowed for 15 minutes to allow equilibrium to be established, followed by three 15 minute collections, during which time the amount of $CO_2$ flowing was monitored at the ISCO pump.

The concentration of the extracts was determined using a UV-vis spectrometer, measuring absorbance at 335 nm. The spectrometer was calibrated with a standard prepared from $Fe(TTA)_3$ dissolved in chloroform. Samples were diluted with chloroform, so that they were within the linear range of the calibration. The RSD for the 3 repeated determinations was found to be ~5%.

The separation of the various metal TTA complexes was carried out using the ISCO SX 2-10 extraction system and a single ISCO pump. Metal complex (0.5 g of each) was loaded into the extraction cell, in a mixture of sea sand, and heated and pressurized with $CO_2$ under static conditions for a short time period (10 to 20 minutes). The extraction exit was then opened allowing the $CO_2$ and dissolved metal complexes to exit the cell. The extracts were collected in chloroform, for a given time period (usually 10 to 20 minutes), with the procedure repeated at each condition. The collected samples were back extracted into concentrated nitric acid and then diluted for analysis, as above.

Complex Collection and Back Extraction

To evaluate the efficiency of the back extraction procedures used, a number of known samples were back extracted from chloroform and the efficiency of the various back extraction processes evaluated. These results are illustrated in Table 7.

TABLE 7

| | Back Extraction into $HNO_3$ | | |
|---|---|---|---|
| Ligand | Direct from $CHCL_3$ | Conc $HNO_3$ | 50% $HNO_3$ TTA |
| 60 | 96 | 46 | |
| TTA + TBP | 90 | 100 | 96 |

Concentrated nitric acid was found to be the most effective system for the collection of samples and was utilized in these experimental examples.

Example IX

This example examines the solubility of $UO_2(NO_3)_2 \cdot 2TBP$ in supercritical carbon dioxide. $UO_2(NO_3)_2 \cdot 2TBP$ was prepared according to the procedure described in Alcock et al., *J. Chem. Soc., Dalton Trans.*, 25 (1982). 2 grams of $UO_2(NO_3)_2 \cdot 6H_2O$ were placed in a 200 ml round bottom flask. 2 mole equivalents of TBP in 100 ml of hexane were added and the mixture stirred for about 2 hours at room temperature. When the uranyl nitrate had dissolved, the organic phase was separated from the water of hydration displaced by TBP, and the solvent evaporated to yield the product as a viscous yellow oil. The product was further purified by dissolving it in about 15 milliliters of hexane, freezing to −50° C. to crystallize the complex, and cold filtering. This process was repeated three times to remove excess TBP. Thin film IR spectra of the liquid phase were obtained using NaCl plates, and the absorption bands corresponded to those reported by Auwer et al.

The solublity of $UO_2(NO_3)_2 \cdot 2TBP$ in supercritical $CO_2$ was determined using UV-VIS spectroscopy over a pressure range of from 100 atmospheres to 300 atmospheres and at temperatures of 40° C., 50° C. and 60° C. Prior to the solublity measurements, the molar absorptivity of the complex at 411 nm was determined using standrads of $UO_2(NO_3)_2 \cdot 2TBP$ in hexane, which was found to be 8.77 1 $mol^{-1}$ $cm^{-1}$. Using Beer Lambert's law the concentration of the comnplex in supercritical $CO_2$ was calculated from subsequent spectroscopic mesurements.

Figure 15:
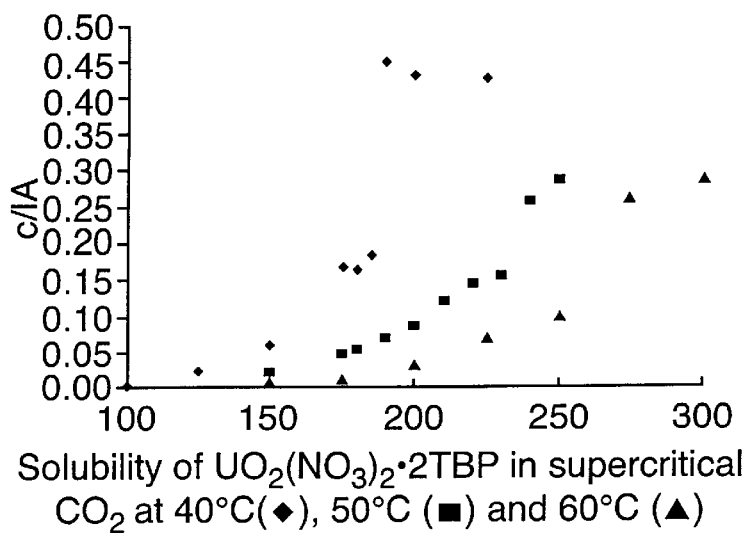
FIG. 15 illustrates the solubility of $UO_2(NO)_2 \cdot 2TBP$ in supercritical carbon dioxide at 40° C., 50° C. and 60° C.

The solubilities of the complex under the conditions investigated are illustrated in FIG. 15. FIG. 15 shows that the solubility of the complex increases with increasing pressure, particularly at low temperatures. At 40° C., the concentration of $UO_2(NO_3)_2 \cdot 2TBP$ in $CO_2$ increases from about 0.0025 M at 100 atmospheres, corrsponding to 2.31 and 397.3 g $l^{-1}$ respectively, and represents an increase in solubilty over two orders of magnitude. The decreased solubility at increasing temperature is attributed to the lower density, and hence decreased solvating power, of the fluid.

This example shows that it is possible to obtain high concentrations of $UO_2(NO_3)_2 \cdot 2TBP$ in supercritical $CO_2$. These solubilites surpass any solubility of any metal chelate previously reported.

III. DISCUSSION OF RESULTS

Varying Solvation Power of supercriticalfluid $CO_2$

The experiments with $UO_3$ and TTA in supercritical fluid $CO_2$ indicate the formation of a complex as evidenced by the formation of a bright orange colored compound on the surface of the $UO_3$. This complex was soluble in $CHCl_3$. Although the complex was formed in the supercritical fluid $CO_2$, the complex was not easily transported, indicating limited solubility. The following reaction between the TTA and $UO_3$ is predicted:

$$UO_3 + TTA \Rightarrow UO_2 \cdot TTA_2 + H_2O$$

The TTA complex was found to be reactive with other metal oxides, including iron oxide, forming a deep red complex.

Reaction Between TTA and Uranyl Nitrate

The reaction of TTA with uranyl nitrate was also studied and found to occur very rapidly, forming an orange yellow complex similar to that seen above in the reaction with $UO_3$. The complex was soluble in $CHCl_3$. Reaction efficiencies were high.

Effect of Temperature and Pressure on the Reaction Between $UO_3$ and TTA

Figure 7:
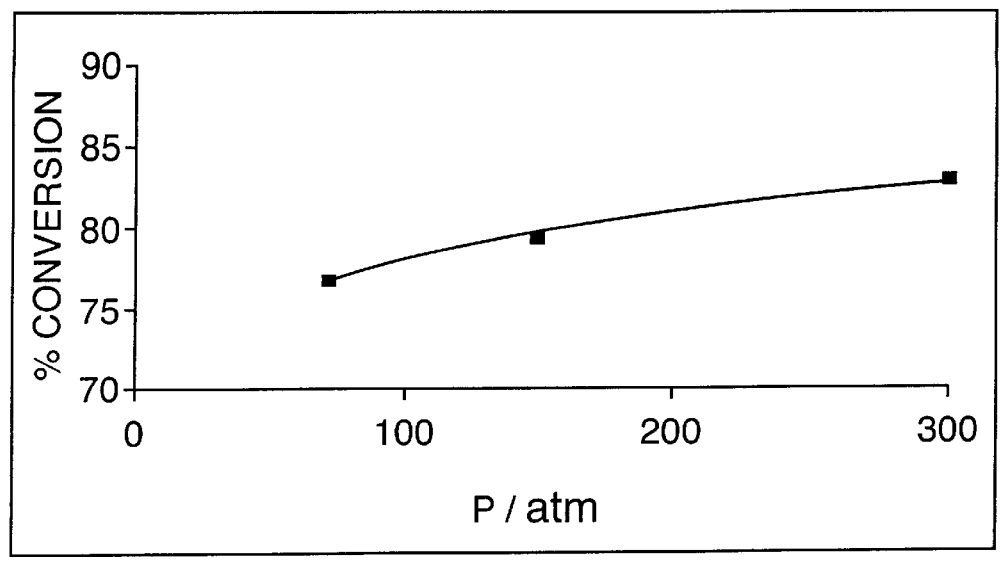
FIG. 7 shows the effect of pressure on the reaction rate of $UO_3$ to $UO_2(TTA)_2$ at 60° C. and after 20 minutes of static reaction time followed by 20 minutes of dynamic flushing of the cell.

The effect on the reaction of varying the pressure of the supercritical fluid $CO_2$ is shown in FIG. 7. More specifically, FIG. 7 shows the effect of pressure on the rate of formation of $UO_2(TTA)_2$ from $UO_3$ at 60° C. and after 20 minutes of static reaction time followed by 20 minutes of dynamic flushing of the cell. The data is the mean of three repeated determinations. 0.5ml of methanol and 0.01 ml of $H_2O$ were added to the 10 ml reaction cell prior to the reaction.

At low pressure, or 70 atm, which is close to the critical pressure for supercritical fluid $CO_2$, and a temperature of 60° C., the lowest reaction efficiency was observed. Specifically, a 77% conversion was observed. The conversion efficiencies were slightly increased by increasing the pressure. At 300 atm, the efficiency was increased to 83%. The lack of significant sensitivity of the reaction to pressure indicates that the reaction was not limited by the solubility of TTA in supercritical fluid $CO_2$ (i.e., all TTA added to the cell was dissolved in the supercritical fluid $CO_2$, under the conditions studied). Also, since the orange complex formed did not dissolve readily into the supercritical fluid $CO_2$, then the reaction was probably limited by kinetics of the solid phase reaction at the oxide and not the transport properties of the supercritical fluid $CO_2$. The nature of the complex formed was a powdery substance loose on the oxide surface and appeared not to inhibit further reaction of the remaining oxide. At all conditions studied, a significant proportion of the $UO_3$ was converted to complex.

Figure 8:
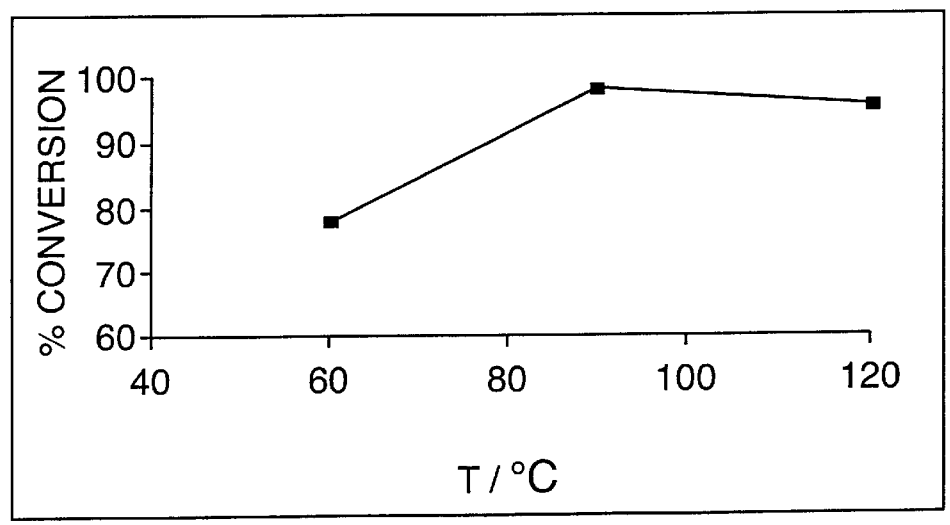
FIG. 8 shows the effect of temperature on the reaction rate of $UO_3$ to $UO_2(TTA)_2$ at 150 atn and after 20 minutes static reaction time followed by 20 minutes of dynamic flushing of the cell.

The effect of temperature on the reaction is illustrated in FIG. 8. (More specifically, FIG. 8 shows the effect of temperature on the rate of formation of $UO_2(TTA)_2$ from $UO_3$ at 150 atm after 20 minutes static reaction time followed by 20 minutes of dynamic flushing of the cell. The data is the mean of three repeated determinations. 0.5 ml of methanol and 0.1 ml of $H_2O$ were added to the 10 ml cell prior to reaction.) This indicates that the reaction was limited by the kinetics of oxide ligand reaction rather than transport properties of the supercritical fluid $CO_2$. At 90° C., the reaction was quantitative after 20 minutes reaction time.

The crystal structure of the complex was determined by X-ray diffraction, and was in fact a $UO_2$/TTA complex containing one molecule of $H_2O$. The high coordination number of actinides is well known, and presence of $H_2O$ in uranyl acetylacetone complexes is also known.

The complex was dissolved in an organic solvent and was observed to change color slightly when TBP was added. It was observed that the coordinated $H_2O$ was replaced by TBP in the complex structure. TBP containing complexes are highly hydrophobic, resulting in enhanced extractions into non-aqueous phases. These type of complexes are referred to as "adducts." The hydrophobic nature of uranyl adduct complexes is important with respect to enhanced solubility in many non-polar solvents and this was found to be the case with supercritical fluid $CO_2$, as discussed herein.

The complex formed was found to be highly sensitive to the exchange of the coordinated molecule of $H_2O$. With recrystallization of the $UO_2(TTA)_2 \cdot H_2O$ from chloroform (containing ethanol as a modifier), a crystal containing an ethanol adduct was obtained.

Purification from Unreacted Ligand

Figure 9:
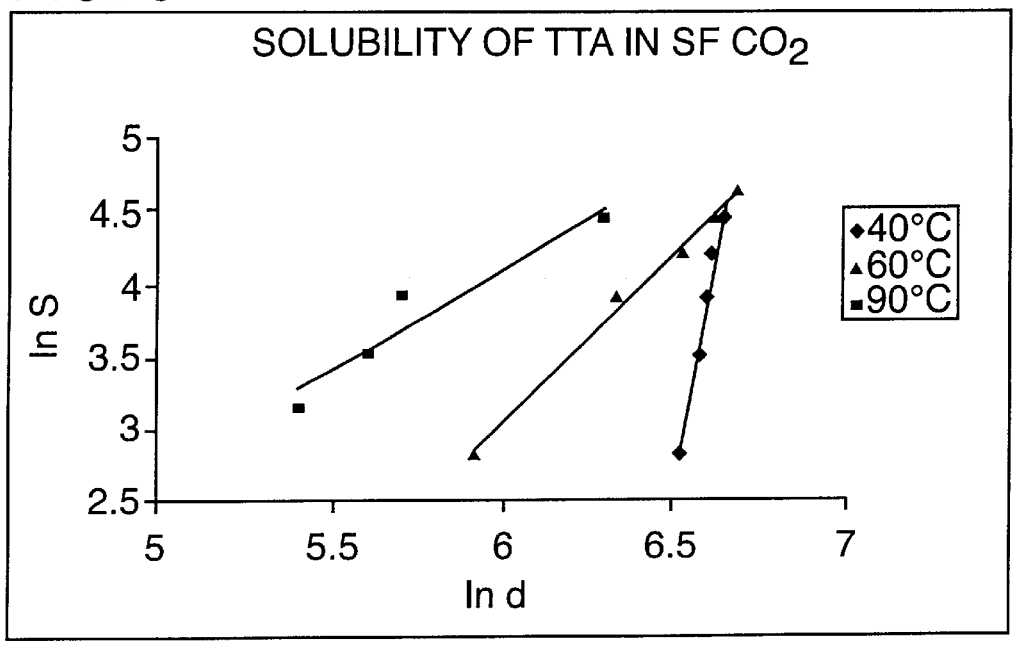
FIG. 9 shows the solubility of TTA in SF $CO_2$ at 40° C., 60° C. and 90° C.

The purification of the uranyl/TTA complex from the free ligand was easily accomplished based on the solubility differences of the two compounds in supercritical fluid $CO_2$. The solubility of free ligand TTA was measured and the results obtained are shown in FIG. 9. In particular, FIG. 9 shows the solubility of TTA in supercritical fluid $CO_2$ at 40° C., 60° C., and 90° C. Solubility and density (d) are given in $gL^{-1}$. Each data point is an average of four repeated determinations. Due to limitations of the cell used, the highest temperature of 120° C. could not be studied. The data is presented in a log solubility versus log density manner, since a linear relationship should be observed, enabling simple correlation of the experimental data. Overall, high solubility of TTA was observed.

The solubility of the $UO_2(TTA)_2 \cdot H_2O$ complex was low in supercritical fluid $CO_2$. Thus, purification of the complex was achieved by flushing the reaction cell with supercritical fluid $CO_2$ after completion of the reaction, where the very soluble TTA was removed, leaving the majority of the low solubility uranyl/TTA complex in the reactor.

This method of synthesis has a number of potential advantages over conventional solution-based procedures, including: (a) dissolving the TTA for reaction with the solid oxide; (b) after reaction, separating unreacted TTA from the complex formed; (c) producing a pure complex without the use of any traditional solvents; and (d) producing a purified product quickly (<1 hr). The method also has the advantage that a purified product is obtained with near 100% conversion of the oxide, whereas traditional solvent based methods provide yields in the range of 30% for uranyl/β-diketone complex preparations.

Purification From Other Metal TTA Complexes

Figure 10:
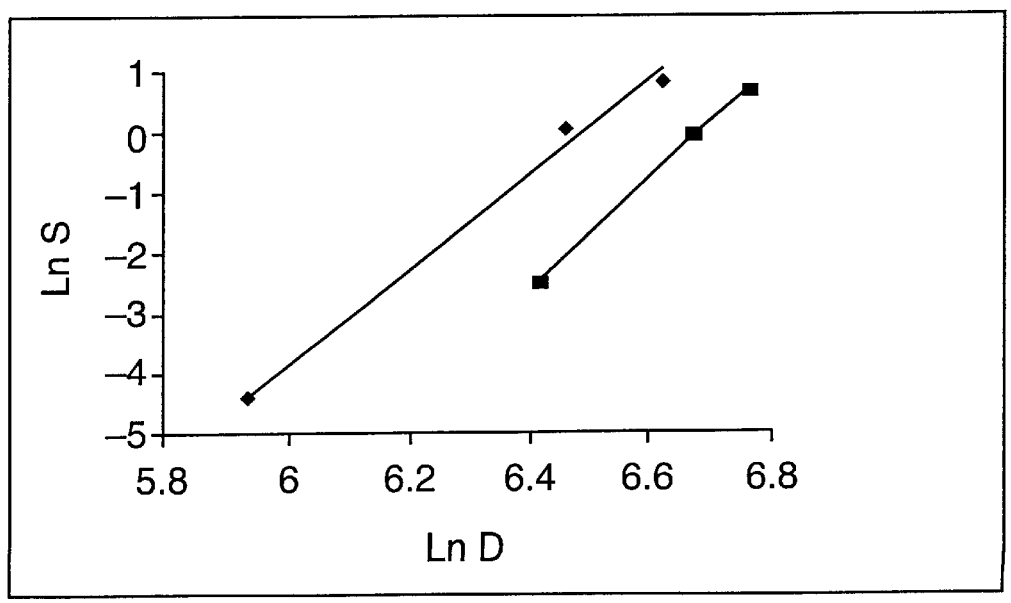
FIG. 10 shows the solubility of $Fe(TTA)_3$ in SF $CO_2$ at 60° C. (data oints shown as squares), and 90° C. (data points shown as circles).

Purification of uranyl chelate complex from other metal complexes is of importance in nuclear waste treatment or in the processing of ore. Separation is facilitated by the relatively low supercritical fluid solubility of the uranyl chelate complex. For example, the solubility of $Fe(TTA)_3$ in supercritical fluid $CO_2$ is illustrated in FIG. 10 at varying temperatures and pressures. FIG. 10 shows the solubility of $Fe(TTA)_3$ in supercritical fluid $CO_2$ at 60° C. (data points shown as squares), and 90° C. (data points shown as circles). Solubility and density (D) are given in $gL^{-1}$. This complex is shown to be highly soluble in supercritical fluid $CO_2$. Thus, the separation of low solubility $UO_2(TTA)_2 \cdot H_2O$ complex from high solubility $Fe(TTA)_3$ complex can be facilitated by the suitable choice of supercritical fluid $CO_2$ conditions.

Figure 11:
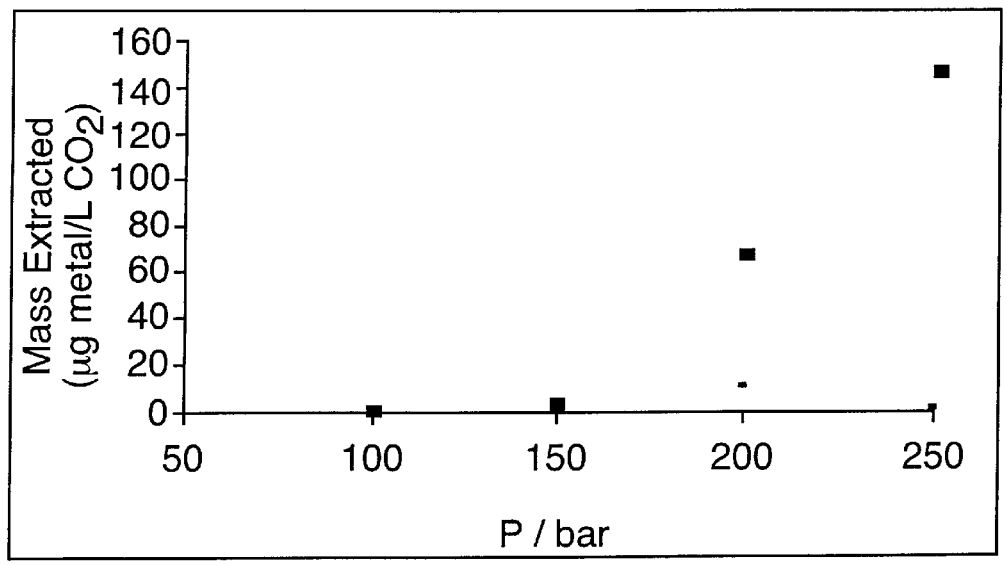
FIG. 11 illustrates data on the separation of uranium and iron into a supercritical fluid ($CO_2$) based on differential solubilities of $Fe(TTA)_3$ and $UO_2(TTA)_2.H_2O$ complexes (at 60° C.).

The separation of iron from uranium based on the differential solubilities of their corresponding metal/TTA complexes is shown in FIG. 11. More specifically, FIG. 11 illustrates data on the separation of uranium and iron into a supercritical fluid ($CO_2$) based on the different solubilities of $Fe(TTA)_3$ and $UO_2(TTA)_2 \cdot H_2O$ complexes (at 60° C.). Fractions were collected for 5 minutes after 20 minutes of static saturation time. Each data point shown represents the mean of three repeated determinations. The results illustrated by FIG. 11 were achieved by extracting a mixture of $Fe(TTA)_3$ and $UO_2(TTA)_3$ complexes for given time periods, and measuring the degree of separation based on the quantity of each metal extracted. With increasing pressure, the degree of separation of Fe from U increased. Hence, by control of the physical properties of the extraction system or supercritical fluid, the degree of separation of given metal systems can be optimized.

Figure 12:
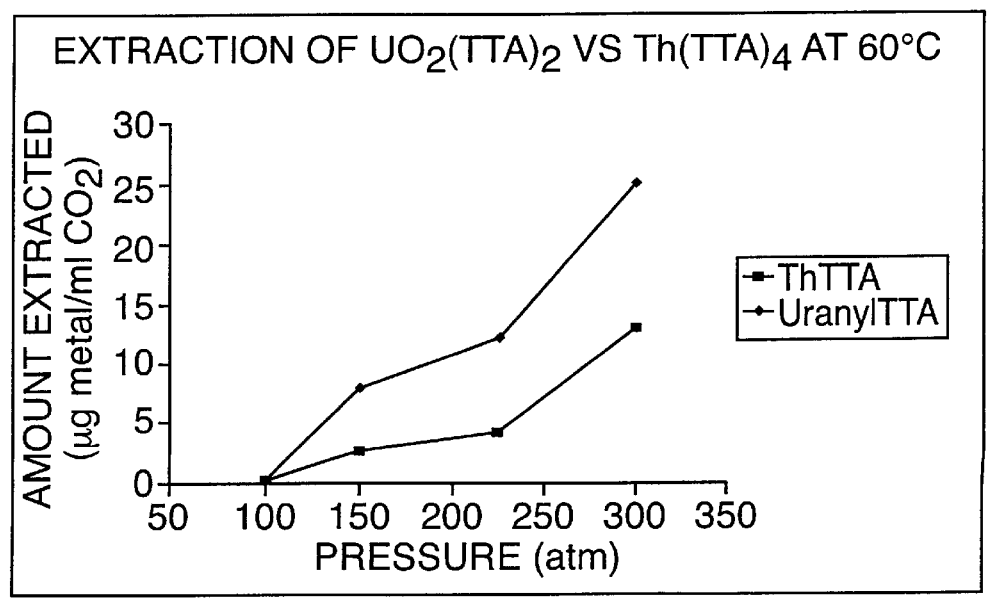
FIG. 12 illustrates data on the separation of $UO_2(TTA)_2$ from $Th(TTA)_4$ at 60° C.

Further, the separation of solid $UO_2(TTA)_2.H_2O$ from $Th(TTA)_4$ is shown in FIG. 12. FIG. 12 illustrates data on the separation of $UO_2(TTA)_2$ from $Th(TTA)_4$ at 60° C. Extracts were collected for 10 minutes in 20 ml of $CHCl_3$ after 10 minutes of static saturation time. Each data point is the mean of two repeated determinations. In this case, the separation of the different metals was less significant, with a slightly higher extraction rate of $UO_2(TTA)_2.H_2O$ complex observed at all pressures above 100 bar. However, although the separation appears lower than in the case of Fe and U, the amounts of U extracted were double those of Th.

Figure 13:
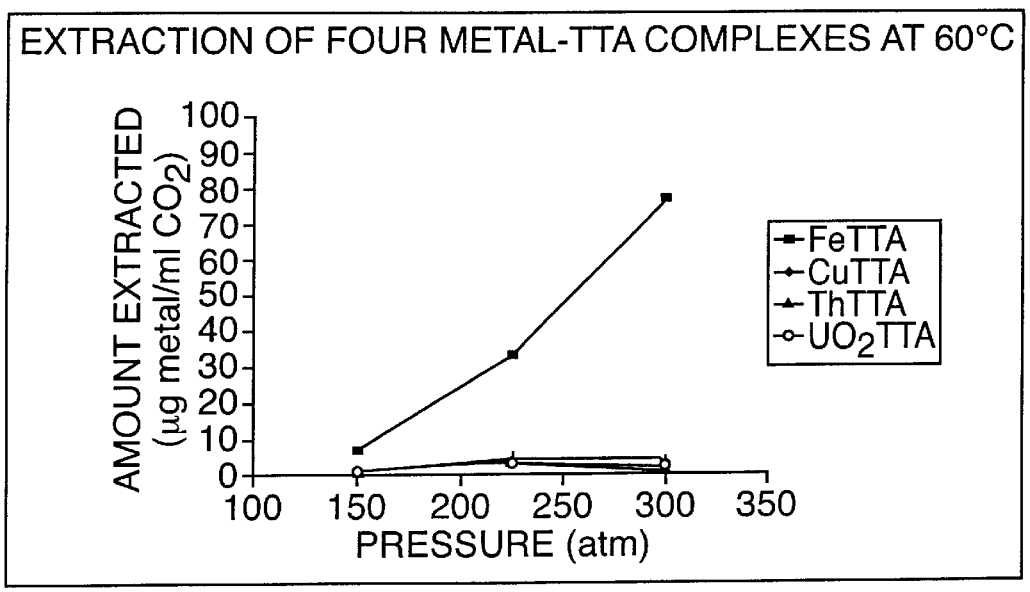
FIG. 13 illustrates data on the separation of four metal/TTA complexes at 60° C.

In FIG. 13, the separation of a number of metal TTA complexes is illustrated. FIG. 13 illustrates data on the separation of four metal TTA complexes at 60° C. Extracts were collected for 10 minutes in 20 ml of $CHCl_3$ after 10 minutes of static saturation time. Each data point is the mean of two repeated determinations. FIG. 13 illustrates that Fe can be selectively extracted over all the other metal complexes, particularly by increasing the pressure. For example, at a pressure of 150 atmospheres, the separation of the complexes is more difficult than at 200 or 300 atmospheres. Moreover, the solvation of one compound (such as Fe) in a supercritical fluid (such as supercritical fluid $CO_2$) can inhibit the uptake of other compounds in that supercritical fluid. Hence, in accordance with the present invention, Fe can be selectively purified from a range of metal TTA complexes. Indeed, the ability to take advantage of the varying solvent power of the supercritical fluid to extract small quantities of impurity from the metal is useful in simplifying the extraction and separation process. In other words, small quantities of impurity can be separated from large quantities of metal, such as uranium, rather than vice versa.

Transport Of Uranyl As An Adduct Complex

The transport of a metal chelate complex in a supercritical fluid can be enhanced by forming an adduct of the complex with an adduct forming agent as discussed herein.

The low solubility of uranyl/TTA complex prevents extraction of significant quantities of uranium in supercritical fluid $CO_2$. If after complex formation a suitable ligand capable of forming adducts to the uranyl chelate complex is added to the supercritical fluid $CO_2$ in small amounts, then the uranyl chelate complex is extracted in significant amounts from the system.

Figure 14:
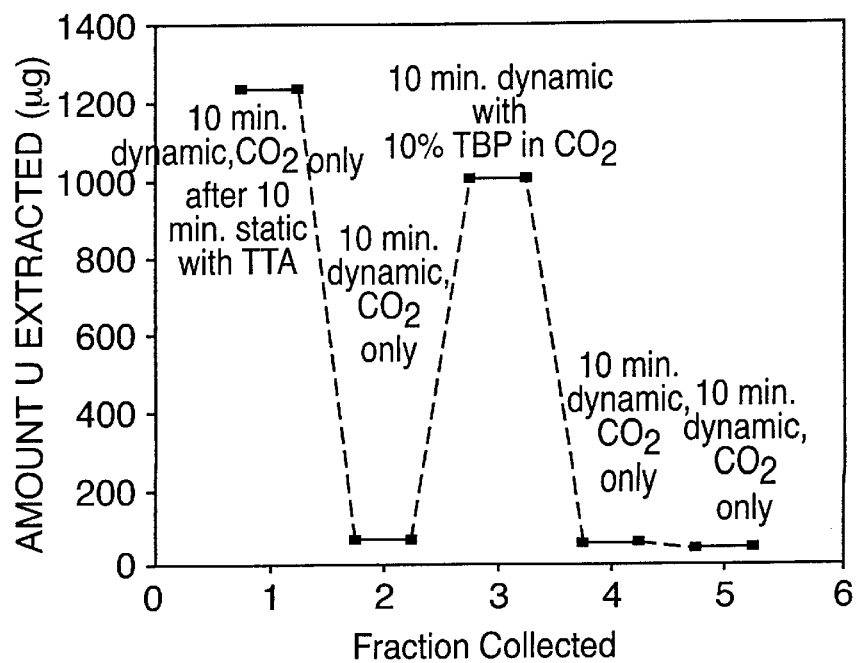
FIG. 14 shows the extraction (at 60° C. and 150 atm) of $UO_2(TTA)_2$ in SF $CO_2$ by adduct formation with tributyl phosphate (or "TBP").

It has been established during supercritical fluid and supercritical fluid chromatography (SFC) studies that such adduct complexes show enhanced stability in supercritical fluid $CO_2$ compared to uranyl/β-diketone complexes in the absence of adducts. This is represented in FIG. 14, where the effects of adding excess TTA and that of adding TBP are illustrated. More specifically, FIG. 14 shows the extraction (at 60° C. and 150 atm) of $UO_2(TTA)_2$ in supercritical fluid $CO_2$ by adduct formation with TBP. Each data point represents an average of six repeated determinations. FIGf. 14 shows that with excess TTA in the extraction cell, a high rate of uranium transport can be attained. When the extraction is carried out in the absence of TTA, the rate of extraction is much lower.

For β-diketone complexes of uranyl, it has been established that the complex $UO_2(A)_2.(HA)_2$ is formed in organic phases (where A=β-diketone anion and HA=β-diketone). Hence, it is likely that excess ligand is required to enhance solubility in the organic phase. This appears to be the case for achieving high supercritical fluid $CO_2$ solubility. The presence of TBP also enhances solubility as shown in FIG. 14. supercritical fluid $CO_2$ modified with 10% TBP results in a 10× increase in the amount of uranium transported. The formation of TBP adducts in the form of $UO_2 (TTA)_2$. TBP has been demonstrated above. In solvent extraction, the inclusion of TBP into the complex results in the increased hydrophobic nature of the complex and thus higher extraction efficiencies. The increase in the hydrophobic nature of the complex also indicates that solubility in supercritical fluid $CO_2$ should be higher and this was observed experimentally.

Accordingly, this aspect of the present invention provides for an environmentally safer and more efficient method for the extraction and separation of metals and impurities, without the use of conventional solvents and the creation of undesirable waste streams.

Figure 16:
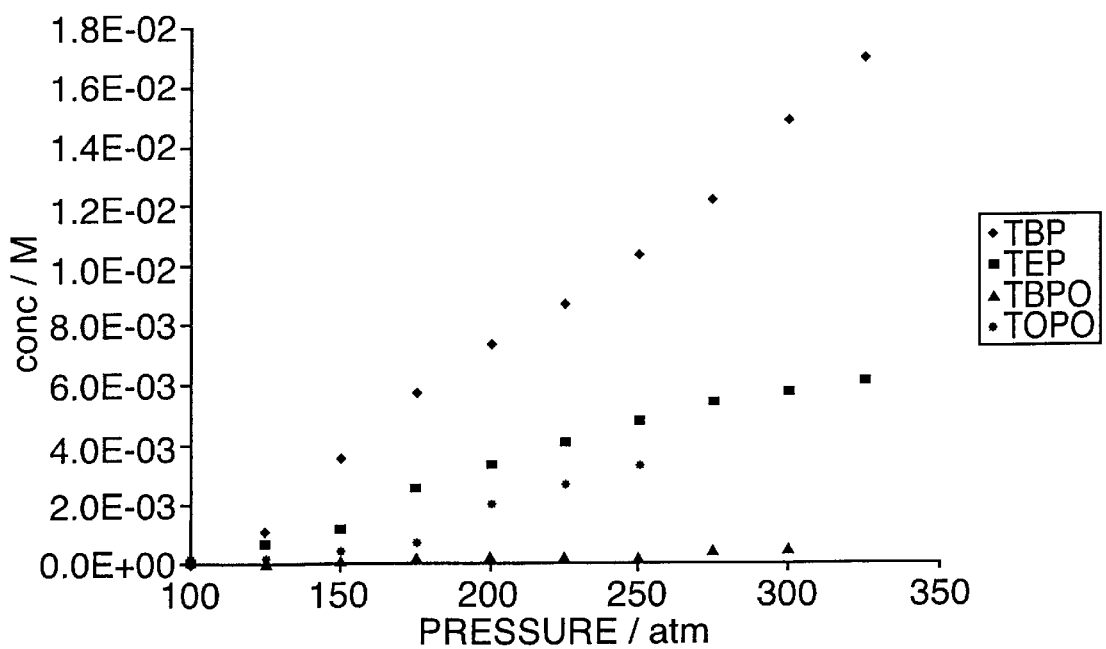
FIG. 16 illustrates the solubility of $UO_2(TTA)_2 \cdot X$ complexes in supercritical carbon dioxide versus pressure for X=TBP, TEP, TOPO and TBPO.

FIG. 16 illustrates the solubility of $UO_2(TTA)_2.X$ in supercritical fluid at 40° C. FIG. 16 shows that the solubility of the complexes increases with increasing pressure. Moreover, FIG. 16 illustrates that various complexes can be separted one from the other by varying the pressure, thereby adjusting the solubility of a particular complex. For example, $UO_2(TTA)_2$.TBP can be separated from other materials by increasing the pressure, since the solubility of this particular complex is much higher than that of most other complexes of $UO_2(TTA)_2$ particularly as the pressure of the supercritical fluid increases.

Having illustrated and described the principles of the invention in several preferred embodiments, it should be apparent to those skilled in the art that the invention can be modified in arrangement and detail without departing from such principles. We claim all modifications coming within the spirit and scope of the following claims.

We claim:

1. A method for extracting a metal or metalloid, comprising:
   exposing a material comprising a metal, a metalloid, or combinations thereof to a supercritical fluid solvent and a chelating agent for a period of time sufficient for the chelating agent to form chelates; and
   varying the solvating power of the supercritical fluid to selectively separate at least one metal or metalloid chelate from other materials in the supercritical fluid.

2. The method of claim 1 wherein the solubility of the at least one metal chelate in the supercritical fluid is enhanced over the solubility of other materials in the supercritical fluid.

3. The method of claim 1, wherein the step of varying the solvating power of the supercritical fluid includes varying a physical property of the supercritical fluid.

4. The method of claim 3, where the step of varying a physical property of the supercritical fluid includes changing the pressure of the supercritical fluid.

5. The method of claim 1, further comprising adding an adduct-forming agent to enhance the solubility of at least one desired metal or metalloid chelate in the supercritical fluid.

6. The method of claim 5, where the adduct-forming agent is a phosphorous containing adduct-forming agent.

7. The method of claim 6 where the adduct-forming agent is tributyl phosphate.

8. The method of claim 1, further comprising the step of separating unreacted chelating agent from the chelates based on the solubility differentials between the unreacted chelating agent and the chelates in the supercritical fluid.

9. The method of claim 1, futher comprising the step of separating at least one desired metal or metalloid chelate from at least one impurity based on the solubility differential between the desired at least one chelate and the at least one impurity in the supercritical fluid.

10. A method for extracting an actinide or a lanthanide from an oxide thereof and purifying the extracted actinide or lanthanide, comprising:

exposing a metal oxide to supercritical carbon dioxide and dissolved chelating agent, at least one of the chelating agents forming chelates with the actinide or lanthanide to extract the actinide or lanthanide from the oxide thereof;

varying the solvating power of the supercritical carbon dioxide so that the solubility of at least one metal or metalloid chelate in the carbon dioxide is enhanced over the solubility of other metal or metalloid chelates; and separating the at least one metal or metalloid chelate from other metal or metalloid chelates based upon a solubility differential.

11. The method of claim 10 where the chelating agent is selected from the group consisting of β-diketones, phosphinic acids, carboxylic acids, and mixtures thereof.

12. The method of claim 11 where the β-diketone is a halogenated β-diketone.

13. The method of claim 10, where the step of varying the solvating power of the carbon dioxide includes varying a physical property of the carbon dioxide.

14. The method of claim 13, where the step of varying a physical property of the carbon dioxide includes changing the pressure of the carbon dioxide.

15. The method of claim 10, further comprising adding an adduct-forming agent to enhance the solubility of a desired chelate in the carbon dioxide.

16. The method of claim 15, where the adduct-forming agent is a phosphorous-containing material.

17. The method of claim 16 where the adduct-forming agent is tributyl phosphate.

18. The method of claim 10, further comprising the step of separating unreacted chelating agent from the chelates based on the solubility differentials between the unreacted chelating agent and the chelates in the carbon dioxide.

19. The method of claim 10, further comprising the step of separating a desired metal or metalloid chelate from at least one impurity based on the solubility differential between the desired metal or metalloid chelate and the at least one impurity in the carbon dioxide.

20. A method for separating metal and metalloid chelates formed during a supercritical fluid extraction process, comprising:

providing supercritical carbon dioxide comprising metal chelates, metalloid chelates, and combinations thereof, where chelating agents used to form the chelates are selected from the group consisting of protic chelating agents and Lewis bases; and varying the solvating power of the supercritical fluid so that the solubility of at least one metal or metalloid chelate in the supercritical fluid is enhanced over the solubility of other metal or metalloid chelates in the supercritical fluid; and separating the metal or metalloid chelates one from another.

21. The method of claim 20, wherein the step of varying the solvating power of the supercritical fluid includes varying a physical property of the supercritical fluid.

22. The method of claim 21, where the step of varying a physical property of the supercritical fluid includes changing the pressure of the supercritical fluid.

23. The method of claim 20, further comprising adding an adduct-forming agent to enhance the solubility of a desired metal or metalloid chelate in the supercritical fluid.

24. The method of claim 23, wherein the adduct-forming agent is a phosphorous-containing adduct-forming agent.

25. The method of claim 24 where the adduct-forming agent is tributyl phosphate.

26. The method of claim 20, further comprising the step of separating unreacted chelating agent utilized in the extraction process from at least one metal or metalloid chelate based on the solubility differential between the unreacted chelating agent and the at least one metal or metalloid chelate in the supercritical fluid.

27. A method for separating a metal or metalloid chelate from other metal chelates, metalloid chelates, chelating agents, impurities, and combinations thereof, comprising:

first forming a metal or metalloid chelate complex by a supercritical extraction process; and thereafter separating the metal or metalloid chelate from other metal chelates, metalloid chelates, unreacted reagents, impurities, and combinations thereof based on a solubility differential between the metal or metalloid chelate and the other metal chelates, metalloid chelates, unreacted reagents, impurities, and combinations thereof in the supercritical fluid.

28. The method of claim 2 where the enhancement of solubility of the at least one metal or metalloid chelate in the supercritical fluid decreases the amount of one or more other metal or metalloid chelates in the supercritical fluid.

* * * * *